United States Patent [19]
Rustad et al.

[11] Patent Number: 6,009,106
[45] Date of Patent: Dec. 28, 1999

[54] DYNAMIC BANDWIDTH ALLOCATION WITHIN A COMMUNICATIONS CHANNEL

[75] Inventors: Mark Rustad, Edina; Terry A. Stripsky, Minneapolis; Steve Wahl, Chanhassen; Glenn A. Rogers, Forest Lake, all of Minn.

[73] Assignee: Digi International, Inc., Minnetonka, Minn.

[21] Appl. No.: 08/971,881

[22] Filed: Nov. 19, 1997

[51] Int. Cl.$^6$ .................................................. H04L 12/64
[52] U.S. Cl. .......................................... 370/523; 370/468
[58] Field of Search .................................. 370/352, 353, 370/468, 465, 354, 493, 522, 523, 524, 442, 395

[56] References Cited

U.S. PATENT DOCUMENTS

| | | | |
|---|---|---|---|
| 4,383,315 | 5/1983 | Torng | 370/457 |
| 4,730,312 | 3/1988 | Johnson et al. | 370/523 |
| 4,763,319 | 8/1988 | Rozenblit | 370/396 |
| 4,928,276 | 5/1990 | Blondeau, Jr. et al. | 370/523 |
| 5,428,608 | 6/1995 | Freeman et al. | 370/261 |
| 5,467,344 | 11/1995 | Solomon et al. | 370/468 |
| 5,661,725 | 8/1997 | Buck et al. | 370/377 |
| 5,668,857 | 9/1997 | McHale | 379/93.07 |
| 5,862,184 | 1/1999 | Goldstein et al. | 375/295 |
| 5,907,547 | 4/1999 | Foladare et al. | 370/352 |

FOREIGN PATENT DOCUMENTS

| | | | |
|---|---|---|---|
| 0428407 | 5/1991 | European Pat. Off. | H04J 3/16 |

OTHER PUBLICATIONS

Huber, M.N., et al., "Modelling of a Multi–queue Polling System with Arbitrary Server Interrupts for the idle–slot–concatenation Packet switching principle in a Hybrid CS/PS Node.", *Teletraffic Science for New Cost Effective Systems, Networks and Services*, Torino, Jun. 1–8, 1998, 521–528, (Jun. 1988).

Ascend Communications, Inc., "Bandwidth Control Protocols: A Brief Discussion of BACP and MP+," World Wide Web, http://www.ascend.com/techdocs/bacp_mp+.html, Jun. 20, 1997, pp. 1–4.

Gandalf Technologies Inc., "XpressConnect 5242i," World Wide Web,http://www.gandalf.ca/Products/xc5242i.html, Jun. 20, 1997, pp. 1–4.

Gandalf Technologies Inc., "Bandwidth Allocation Control Protocol (BACP)," World Wide Web, htp://www.gandalf.ca/Whitepaper/bacp.html, Jun. 20, 1997, pp. 1–2.

Axner, David H."Beefing up the staples of WAN communications;Overview: Modems and Multiplexers; Buyers Guide, " Information Access Company. vol.10; No. 5; p. 62–71;ISSN: 1052–049x.

*Primary Examiner*—Douglas W. Olms
*Assistant Examiner*—Kenneth Vanderpuye
*Attorney, Agent, or Firm*—Schwegman, Lundberg, Woessner & Kluth PA

[57] ABSTRACT

A communications device is presented that allows dynamic bandwidth allocation of an unswitched data path based upon the current utilization of one or more switched data channels. The device operates over the local loop of a digital communications carrier, such as a T1 line, that has a variety of time division multiplexed channels. Each data channel can be configured to operate as a channel dedicated to carrying unswitched data on the unswitched data path, or as a switched channel. Switched channels maintain status information about their current status, allowing switched data communication when the channel's status is active, and permitting the unswitched data path to utilize the channel when the channel's status is idle. In one embodiment, channel status information is passed to a remote unit by altering a redundant robbed-bit signaling bit in a multiframe. In a second embodiment, channel status is determined by monitoring switching information that is already transmitted about the channel. In the second embodiment, a preset time delay is required to properly synchronize bandwidth switching. Unswitched data is transmitted over the switched data channels utilizing all bit locations other than the locations taken by the four robbed-bit signaling bits. A method for dynamically reallocating the bandwidth of an unswitched data path utilizing these same techniques is also presented.

26 Claims, 13 Drawing Sheets

|     | F1 | F2 | F3 | F4 | F5 | F6 | ... | F23 | F24 |
|-----|----|----|----|----|----|----|-----|-----|-----|
| FBIT |   |    |    |    |    |    |     |     |     |
| C1  |    |    |    |    |    |    |     |     |     |
| C2  |    |    |    |    |    |    |     |     |     |
| C3  |    |    |    |    |    |    |     |     |     |
| C4  |    |    |    |    |    |    |     |     |     |
| C5  |    |    |    |    |    |    |     |     |     |
| ... |    |    |    |    |    |    |     |     |     |
| C23 |    |    |    |    |    |    |     |     |     |
| C24 |    |    |    |    |    |    |     |     |     |

FIG. 3

DYNAMIC BANDWIDTH ALLOCATION WITHIN A COMMUNICATIONS CHANNEL

FIELD OF THE INVENTION

The present invention relates generally to multiplex communications systems, and more particularly to the field of bandwidth allocation in such a system. Specifically, this invention addresses dynamic allocation of bandwidth in the local loop environment.

BACKGROUND OF THE INVENTION

In the 1950s, telecommunications companies began to develop high bandwidth digital communications technologies in order to allow more phone calls to be simultaneously transmitted over copper wire. The first digital transmission carrier, called T1, was developed by AT&T in 1956 and is still in use today. A T1 line is capable of transmitting 1.544 Megabits per second (Mbps). Originally utilized to connect telephone central offices, in the early 1980s T1 lines began to be utilized in the local loop.

The local loop is often thought of as the connection between a local telecommunications office and an end-user. The "end-user" could be an actual customer of telephone service, a bandwidth reseller such as an Internet service provider, or even a site maintained for the convenience of a telecommunications company. Although the local loop is commonly referred to as the "last mile," local loop lengths in the United States are more typically about 2.5 miles, and some local loop implementations having a maximum range of almost 50,000 feet.

Digital transmission carriers such as T1 are usually "channelized" into multiple channels using Time Division Multiplex (TDM) technology. TDM channels are created by a multiplexer that divides a digital carrier into separate, individual time segments. Each time segment is allocated for the exclusive use of a single channel. The standard T1 line is divided in this manner into 24 separate channels. Each channel transmits 8 bits of digital data before the next channel begins transmitting. Since every channel sends 8 bits down the T1 line in turn, a series of 192 bits (8 bits times 24 channels) is created before the process can repeat. Before each series of bits, the multiplexer adds an additional bit called the framing bit. Thus, data on a T1 line is sent in 193 bit long "frames." These frames are transmitted about 8,000 times per second.

Each channel in a T1 line is called a DS-0 channel. Similarly, the total T1 line is often referred to as a DS-1 line. Thus, there are 24 DS-0 channels in a DS-1 line. Each DS-0 channel transmits at 64 k bps. This transmission speed is the ideal bandwidth for voice communication, since voice communication is generally sampled and digitally converted into 8 bit words 8,000 times per second. In addition to serving voice communication, these DS-0 channels are commonly used for digital data communication.

The individual DS-0 channels can be operated in either a "switched" or "dedicated" fashion. Switched data channels allow the communication on the channel to be switched on and off. Voice communication is an example of switched data, in that there are times when the voice channel is active or "off-hook," and other times when a voice channel is inactive or "on-hook." Data communication can also operate in a switched fashion, sometimes actively communicating data and other times being inactive.

In order for a switched data channel to be switched on and off, it is necessary to signal the current status of the communication. In a voice channel, for example, it is necessary to indicate when a telephone receiver is picked up to place a phone call (signaled by an off-hook status indication), and to indicate when a local line should start ringing.

In contrast, a dedicated communication channel does not transmit status information and is always active. Although a dedicated channel may only be transmitting useful information at specific times, it does not ever become inactive.

Another important aspect of channelized digital transmission carriers is the possibility of combining multiple channels to obtain a higher bandwidth digital data path. For instance, three DS-0 channels can be combined into a single 192 k bps data communications path. Techniques for combining separate channels into a single, higher bandwidth digital communications path are well-known in the prior art.

It is common to have switched and unswitched data appearing simultaneously on the same channelized communication link. For example, a T1 to an office could be utilized to carry both voice communications over switched data channels and computer communications with the Internet over dedicated data channels. Traditionally, some DS-0 channels in the T1 line would be dedicated to carrying the switched, voice communications, while other DS-0 channels would carry the unswitched data communications.

Unfortunately, this fixed allocation of bandwidth on a local loop T1 line wastes bandwidth, since the switched DS-0 channels carry no data when they are idle. A better approach is to dynamically allocate the bandwidth on an as-needed basis. With dynamic bandwidth allocation, the inactive voice channels can be utilized to handle unswitched data communications when no voice calls are active, and yet would be available for voice communications when a signal to make the voice channel active is received.

The basic idea of allowing the same data channels to be used for both switched and unswitched communication is not new. One approach to doing so is implemented through Asynchronous Transfer Mode (ATM) technology. This technology is able to successfully provide and manage bandwidth for voice, video, and data applications. To accomplish this task, ATM utilizes "cell relay" techniques instead of relying on data channels created by time division multiplexing. In cell relay, each communications task, whether data, voice, or video, is divided into fixed size packets, or "cells," that contain a small amount of data and header information to direct the cell. Each cell is then transmitted with all other cells across the same communications path, and is directed toward its destination by the header information. Once the cells arrive at their destination, the communication is then reconstructed. While ATM may be the best solution for large-scale bandwidth-management problems, it is overly complex, too resource intensive, and too expensive for handling variable bandwidth assignments on the local loop.

A better approach is to keep the DS-0 channels created via time division multiplexing, and instead develop simpler techniques of dynamic bandwidth allocation. Unfortunately, the currently known prior art methods utilizing this approach fail to provide bandwidth allocation in a simple yet effective manner.

For instance, in U.S. Pat. No. 4,763,321 issued to Rozenblit and assigned to Bell Communications Research, Inc., a method for handling variable bandwidth allocation by changing the allocation of DS-0 channels is presented. This invention relates to Distributed Burst Switching Systems (DBSS), a system that uses virtual circuits in the manner of ATM, X.25 and Frame Relay. However, DBSS passes the frames containing the data through standard DS-0 channels.

In standard DBSS, no virtual circuit can utilize more than one DS-0 channel, hence limiting transmission speeds on a virtual circuit to no more than 64 k bps. The Rozenblit invention allows a single virtual circuit to utilize more than one DS-0 channel. To accomplish this, no packets are transmitted between two nodes in a link until a 32 bit header is passed to the next node identifying the virtual circuit and specifying the number of DS-0 channels to be utilized for the virtual circuit. When a transmission between two nodes is completed, the transmitting node sends a 32-bit flag concluding the communication. When the ending flag is received, the DS-0 channels that had been utilized for the communication are freed up for use in another transmission. Unfortunately, the Rozenblit invention suffers from the same basic problems as the ATM technique, in that it imposes needless complexity and overhead on the relatively straightforward situation of dynamic bandwidth allocation on the local loop.

Another bandwidth allocation scheme is revealed in U.S. Pat. No. 4,383,315, issued to Torng and assigned to Bell Telephone Laboratories. This invention is intended for use in a loop transmission system, where multiple nodes communicate by passing transmissions on to the next node in the loop. This approach modifies the content of the communication link to indicate the state of a channel. A key aspect in this invention is the process of deciding when to seize an idle time slot, given that other nodes present in the loop may also wish to use the time slot. Unfortunately, this application has little direct application to the allocation of bandwidth on the local loop. Unlike a loop transmission system, a local loop has only two nodes, and communicates over standard DS-0 channels. In addition, the Torng invention suffers in that it utilizes a type of collision detection, in which data messages can be overwritten before receipt by the intended node, and overcomes this problem by incorporating statistically based delays into the transmission of data. These delays prevent full utilization of available bandwidth, and are unnecessary in the local loop environment.

A third prior art approach to dynamic bandwidth allocation could be used on the local loop. In U.S. Pat. No. 5,467,344, issued to Solomon and assigned to Ascom Timeplex Trading AG, a system is disclosed specifically for changing bandwidth allocation across a T1 transmission line. In this disclosure, a method is described for using "pad" codes to fill data channels in transition. When a DS-0 channel on the T1 line is to be reallocated, these pad characters fill the soon-to-be reallocated DS-0 channel while a separate reconfiguration message is sent and confirmed on a different channel. Once the reallocation message is confirmed by the remote node, the reallocated DS-0 channel begins to carry live data. This method is used to avoid having to synchronize the switching of the bandwidth at each end of the link. As a result, this method is useful in long-haul environments where frame order and multiframing may be lost. A disadvantage to this approach is that special hardware is required that can eliminate the pad codes and encode and decode data to avoid spurious pad codes that might otherwise appear in a data stream. These disadvantages occur because the Solomon technique is not narrowly suited to the local loop environment, but instead is generally applicable to remote communication over channelized digital lines. This results in needless complexity, cost, and bandwidth overhead.

A final approach in the prior art is the utilization of dedicated signaling channels, such as that used with ISDN. In Basic Rate Interface ISDN, or BRI, two DS-0 channels of 64 k bps bandwidth (referred to as B Channels) are combined with a 16 k bps signaling channel (referred to as the D Channel). In Primary Rate Interface ISDN, or PRI, twenty-three DS-0 channels of 64 k bps bandwidth (B Channels) are combined with one 64 k bps signaling channel (the D Channel).

ISDN technology can be used to provide dynamic bandwidth allocation between switched data and unswitched data on the local loop. By taking advantage of the dedicated signaling channel, ISDN routers (such as the XpressConnect 5242i available from Gandolph Technologies Inc. of Nepean, Ontario, Canada) can handle dynamic bandwidth allocation. When used with Internet connection protocols such as the PPP Bandwidth Allocation Control Protocol (BACP) and the PPP Multilink specification (RFC 1717), also known as Multiport Protocol (MP), this type of ISDN router dynamically allocates bandwidth between a single unswitched data path (the PPP Internet connection) and a switched data path (a voice call). When a phone receiver is picked up, the bandwidth allocated to the PPP data path is reduced by 64 k bps and a DS-0 channel is available for the voice communication. When the voice call is over, the DS-0 channel previously carrying the voice call is reallocated to the PPP data path.

The primary disadvantage of ISDN variable bandwidth allocation on the local loop is that the D channel must be dedicated to handling signaling. Although the D channel can be used separately to handle other data tasks, it can not be utilized fully as part of the unswitched data path or as a switched data path. In addition, expensive ISDN technology is required to implement this technique. Although ISDN is often considered to have a bright future, few parties have invested heavily in ISDN equipment.

This invention addresses these problems in the prior art by providing a simple, non-intrusive mechanism for dynamically reallocating digital communication channels between switched and unswitched data in the local loop. The invention allows bandwidth assigned to switched channels to be reassigned to expand the bandwidth of an unswitched digital data path when said switched channel is inactive. Whenever a switched channel becomes active, the bandwidth would be returned to the switched channel. This is accomplished without using the complex procedure of combining switched and unswitched data on the same channel through the use of cells. In addition, the invention does not need to utilize complex and bandwidth intensive reconfiguration messages or padding characters. Instead, the invention is able to utilize the signaling already associated with a switched data channel to determine the timing of dynamic bandwidth switching.

SUMMARY OF THE INVENTION

This invention provides a means for reassigning bandwidth from idle switched data channels to an unswitched digital data path. While the invention can handle multiple switched data channels, it is designed to maintain only one variable bandwidth unswitched data path. As a result, the implementation of dynamic bandwidth allocation can be kept simple. The bandwidth of the unswitched data path will dynamically expand to utilize switched data channels whenever such channels go idle. Similarly, the bandwidth of the unswitched data path is decreased when a switched data channel becomes active.

To accomplish this task, the present invention uses the inherent signaling built into switched channels to determine when any of said switched channels are idle and the channel's bandwidth may be reassigned. This method may be used when signaling is embedded in a switched channel, such as in the case of "robbed-bit signaling," or when the signaling is carried on a dedicated signaling channel. In all cases, the signaling information for the switched channels is carried at all times.

A first embodiment of this invention encodes an indication of the current bandwidth allocation for a switched channel directly into the data stream on that channel. This embodiment takes advantage of the use of multiframing of T1 frames as well as robbed-bit signaling.

Although a single T1 frame is 193 bits in length, in most cases 12 or 24 T1 frames are combined to form a single multiframe. Multiframes containing 24 frames are known as extended superframes, or ESF. In a 24-frame ESF, four robbed-bit signaling bits are presented for each switched data channel. However, current standards for robbed-bit signaling only use the first two robbed-bit signaling bits, known as the A and B signal bits. The third and fourth signaling bits, known as the C and D signal bits, are redundant and are set identically to the A and B bits.

This first embodiment of the present invention utilizes 24-frame extended superframes, and takes advantage of the redundant C and D signal bits. In every ESF sent via this embodiment, the C signal bit is utilized as the channel status signal indicating the status of the channel for the next ESF. Since a switched data channel can have only two states, use as a switched data channel or use as part of the unswitched data path, the channel status signal needs to be only a single bit in length. Upon receipt of an ESF frame utilizing this embodiment of the invention, the C signal bit is reset to equal the A signal bit before being passed on by the present invention. In this way, communications equipment connected to the present invention will receive Extended Superframes that appear completely unaltered by the invention.

An additional aspect of this invention is the maximum utilization of data on a switched data channel. Most data communicated on a switched data channel utilizing robbed-bit signaling is limited to 56 k bps, using only 7 bits in each frame are utilized for data. This is true even though the robbed-bit signaling bit appears only in one frame out of six. The present invention utilizes all 8 bits for transmitting data in frames that do not contain a robbed-bit signaling bit, thereby improving the bandwidth for switched data traffic to 62.67 k bps.

Another aspect of the invention relates to the implementation of signaling dynamic bandwidth allocation in the local loop in a device having a plurality of local communication equipment interfaces. In the local loop, dynamic bandwidth allocation was not previously available except through the use of a dedicated signaling channel that is unavailable for use as part of the unswitched data path (as in ISDN). This aspect of the invention provides variable bandwidth allocation in a non-ISDN local loop environment.

In a second embodiment of the dynamic bandwidth allocation invention, no alteration is made to the switching signals normally sent over the communications channel. When the normal switching signal is sent by the telecommunications device attached to the invention, the transmitting and receiving devices embodying this second embodiment of the invention simply monitor the signal. This signal can either be embedded in the channel, such as through robbed-bit signaling, or be transmitted through a dedicated signaling channel, such as an ISDN D Channel. At some pre-determined time after monitoring that signal, typically measured in frame or multi-frame intervals, both devices will simultaneously reallocate the bandwidth for the data stream being transmitted to the other end.

BRIEF DESCRIPTION OF THE DRAWINGS

FIG. 3 is a chart showing the structure of an extended superframe.

DETAILED DESCRIPTION OF THE INVENTION

Dynamic Bandwidth Allocation

Figure 1:
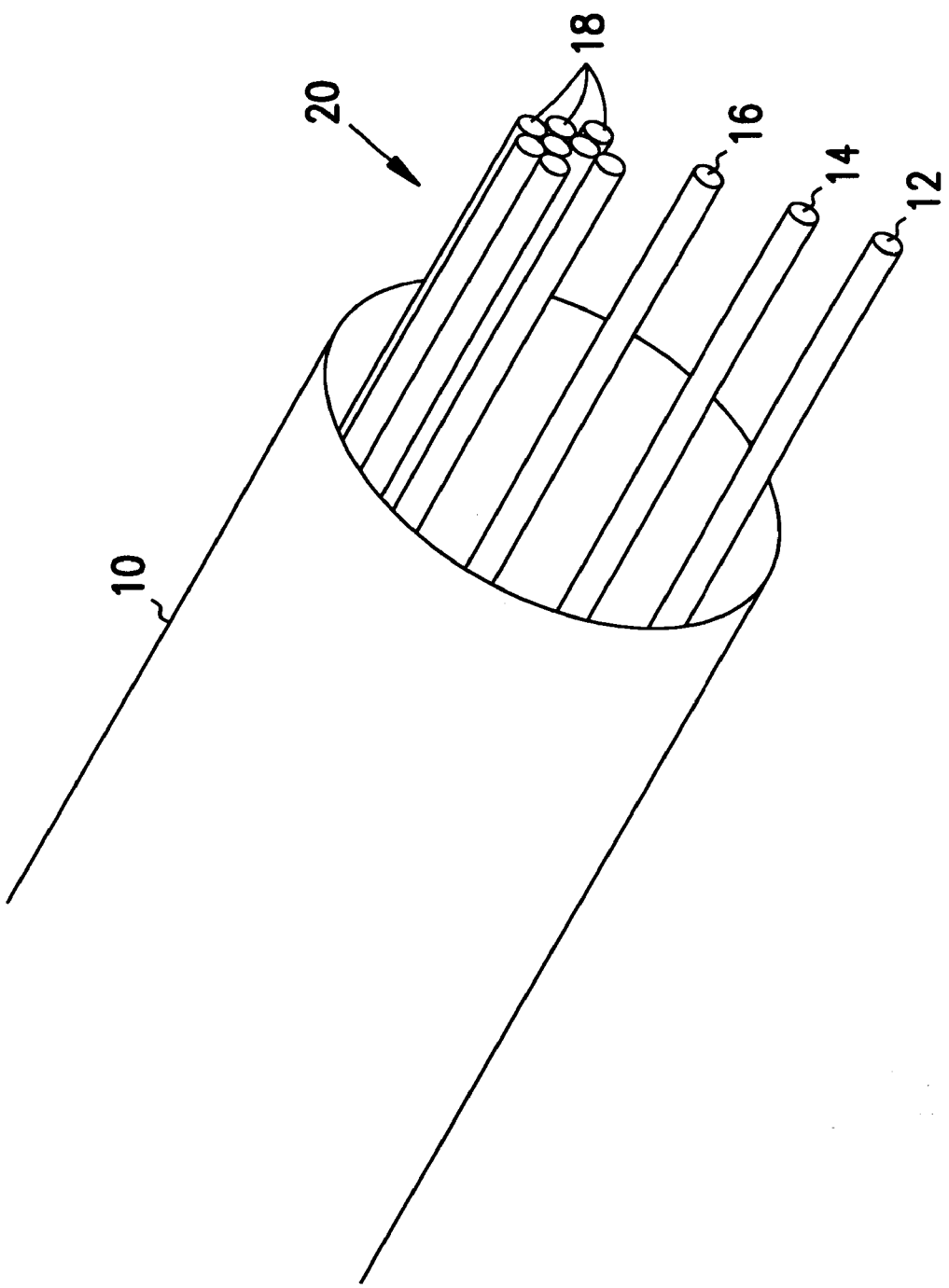
FIG. 1 is a representational view of a digital carrier having multiple channels, some of which form a single unswitched data path.
Figure 2:
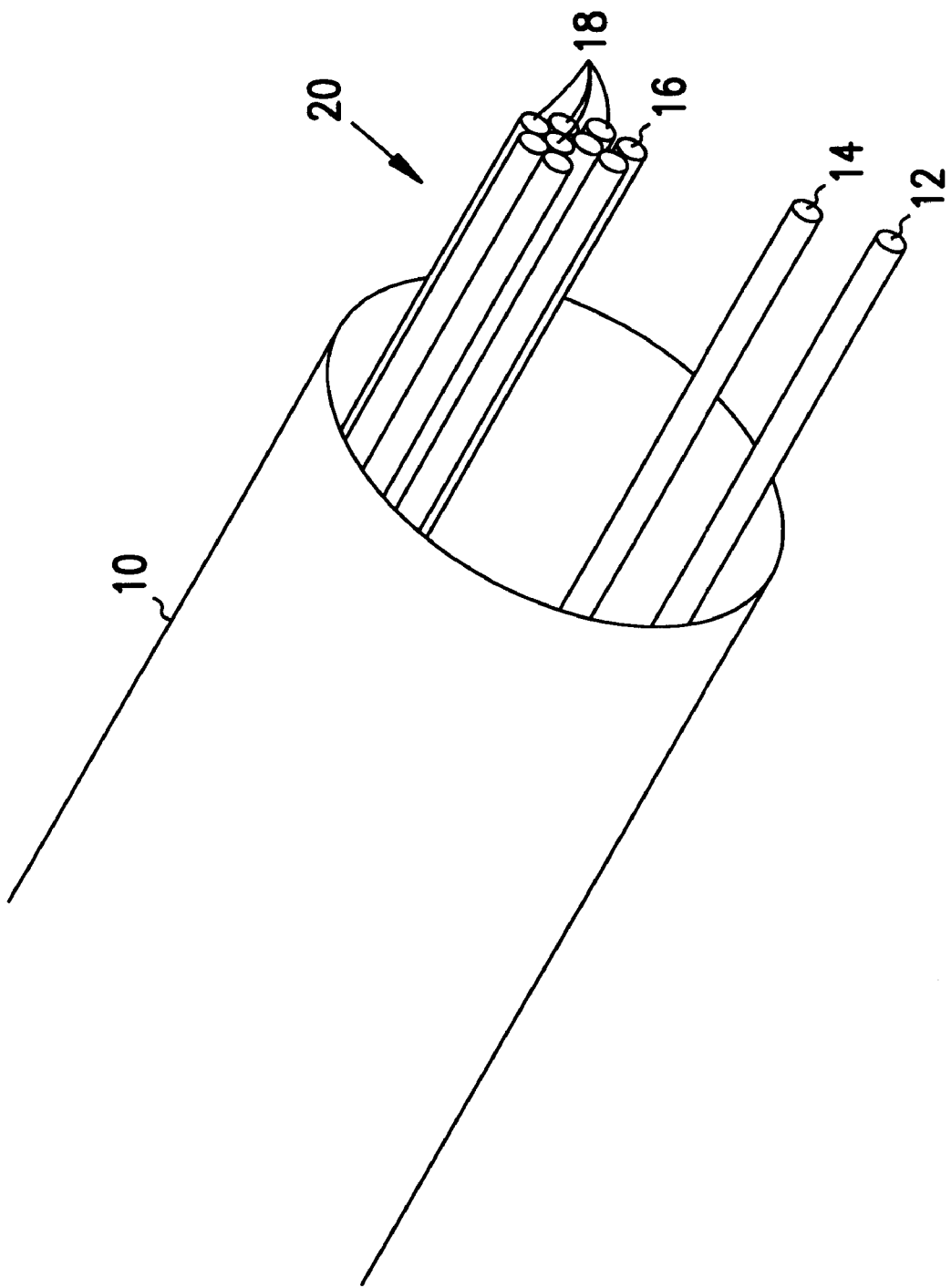
FIG. 2 is a representational view of the digital carrier of FIG. 1, in a second state.

FIGS. 1 and 2 show a representational view of a digital transmission carrier 10 comprised of separate channels 12, 14, 16, and 18, with the channels denoted by figure number 18 comprising a bundle of separate channels. These figures are representational in nature, in that they are designed to show dynamic bandwidth allocation rather than the true nature of a digital transmission carrier. For instance, each of the channels 12–18 in FIGS. 1 and 2 are shown as separate, physical entities. However, channels in a digital transmission carrier 10 are actually created by dividing the large bandwidth of carrier 10 into separate time slots through time division multiplexing (TDM). In addition, the representational digital transmission carrier 10 in FIGS. 1 and 2 contains only eleven channels 12–18, as opposed to the 24 DS-0 channels typically found on a T1 line. Nonetheless, the FIGS. 1 and 2 are useful for showing the process of dynamic bandwidth allocation in the present invention.

Each of the channels 12–18 in the present invention can be configured to operate in either a "switched" or "dedicated" fashion. Switched communications allow the flow of data to be turned on and off, such as when a voice line goes off-hook or on-hook. Although data communications can also operate in a switched fashion, switched data lines will generally be described as voice communications in this application.

Channels 18 that operate in a dedicated fashion are not capable of signaling the status of communication on the channel. As a result, dedicated channels can not be utilized to carry voice communications (or switched data communications), and are dedicated to carrying unswitched data.

Channels 12–18 each have identical bandwidths. However, several channels 18 have been combined to form a single higher bandwidth digital data path 20 utilized to carry unswitched data. The techniques for combining channels 18 into a single data path 20 are well known in the prior art. When channels 18 are combined in this way, the bandwidth of the digital data path 20 is equal to the sum of the bandwidth for each of the combined channels 18. Under the current invention, only one unswitched data path 20 is ever present within a carrier 10. As a result, channels 12–18 that are configured to operate in a dedicated fashion will always comprise part of the unswitched data path 20.

In FIG. 1, Channels 12, 14, and 16 are carrying switched data such as voice communications, and are therefore shown as separate from the unswitched data path 20. Since these channels 12, 14, and 16 are carrying switched data, they must be configured to operate in a switched fashion.

In FIG. 2, channel 16 has combined with channels 18 to form part of the unswitched data path 20. This occurs in the present invention when channel 16 signals that the switched data communication it was carrying in FIG. 1 has terminated. Rather than allowing the bandwidth contained in channel 16 to go unutilized, the present invention begins to utilize channel 16 to carry unswitched data, thereby effectively increasing the bandwidth of the unswitched data path 20 by the bandwidth of channel 16. If channel 16 were to signal that a new switched data connection were needed, the invention would remove channel 16 from the unswitched data path 20, and would return to the state shown in FIG. 1. The details of these processes are explained below.

Channels 12 and 14 could also dynamically be integrated into the unswitched data path 20 in the same manner as shown for channel 16. In addition, any channels 18 shown in FIG. 1 as comprising unswitched data path 20 that are configured for switched operation could signal the invention that a new switched data path is needed and be removed from the bundle forming path 20.

It should be noted that the dedication of channels 18 to carrying unswitched data actually limits the flexibility of the invention, since they are not available for carrying switched data. However, the ability to dedicate channels 18 in this manner is useful in that dedicated channels do not need to transmit signal information. Thus, unless the channel 18 could realistically be needed to carry unswitched data, the dedication of the channel 18 would reduce overhead for the invention and increase bandwidth, as explained below.

T1 Framing

Figure 3:
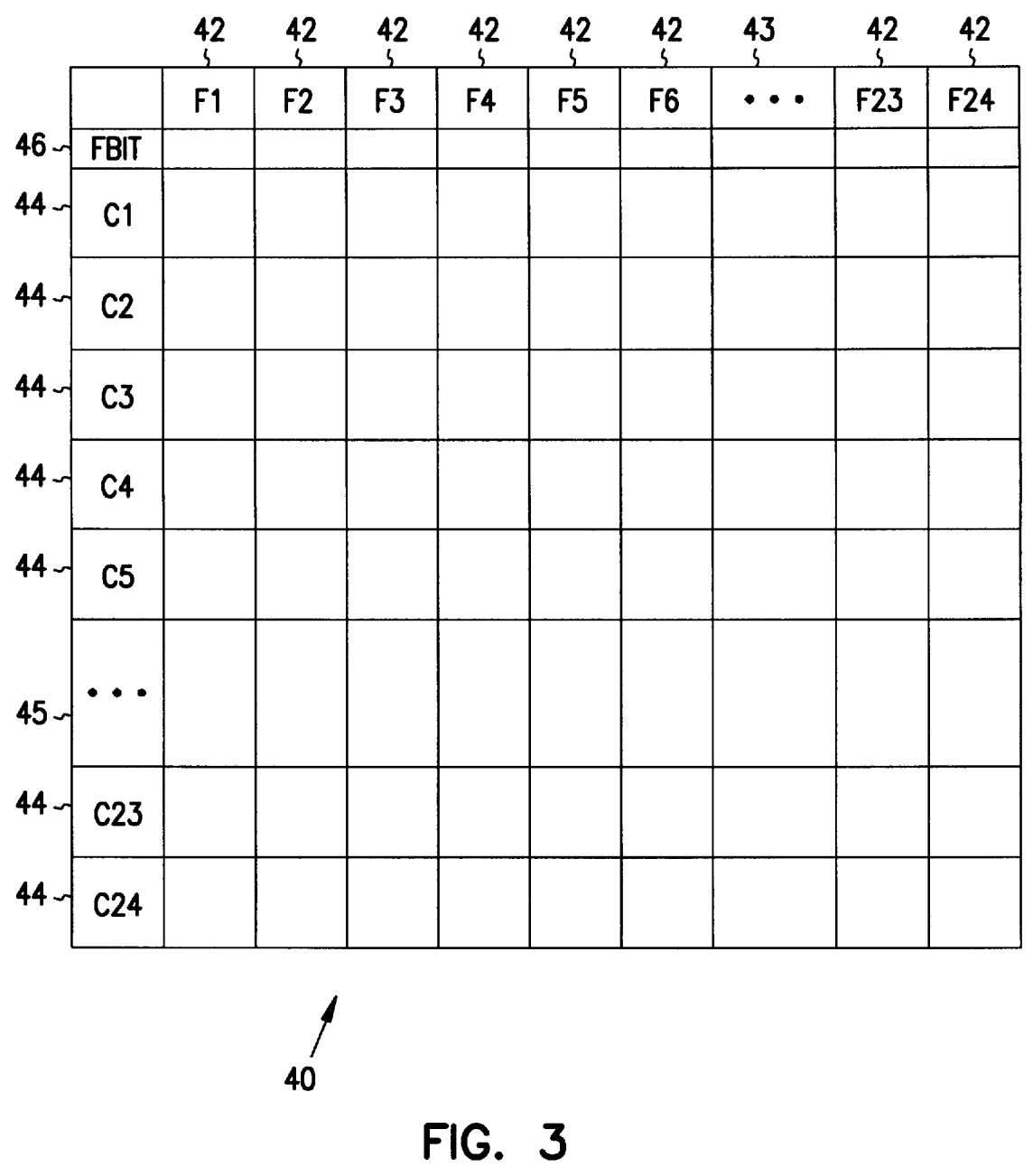

FIG. 3 shows a T1 extended superframe or ESF 40 as utilized in the first embodiment of this invention. Use of the extended superframe 40 is a standard framing technique for transmitting a 1.544 Mbps T1 (or DS-1 ) line.

The ESF 40 contains twenty-four separate frames 42, of which only the first six and last two frames 42 are explicitly shown in FIG. 1. The remaining frames 42 are indicated via the ellipses 43 in FIG. 1. The individual frames 42 are labeled in the top row of FIG. 3 by the letter F combined with the frame number.

Each frame 42 contains data for twenty four separate DS-0 channels 44. FIG. 1 explicitly shows only the first five and last two channels 44 for each frame 42; the remaining channels are indicated in FIG. 1 via ellipses 45. The individual channels 44 are labeled in the left-most column of FIG. 3 by the letter C combined with the channel number.

Each channel 44 in a frame 42 contains eight bits of data (not shown in FIG. 3). The frames 42 on a T1 line are transmitted eight thousand times per second, resulting in a bandwidth of 64 k bps for each of the twenty-four DS-0 channels 44.

In addition to the DS-0 channels 44, each frame 42 also contains a single frame bit or Fbit 46, which can be used for frame synchronization and other signaling information. The utilization of the Fbit 46 for signaling is standard in the prior art, and is not utilized in any unique manner in the present invention. With the inclusion of the Fbit, each frame 42 contains a total of 193 bits of data (twenty-four channels times eight bits per channel plus one Fbit).

Robbed-Bit Signaling

Each of the channels 44 may be configured to operate in either a switched or dedicated mode. The channels 44 that carry switched data need to convey signal information about the current transmission status of the switched data. Traditionally, this status information is carried in every sixth frame 42 through the use of robbed-bit signaling. Robbed-bit signaling utilizes the least significant bit in every sixth frame 42 of each switched data channel 44 as a signaling bit.

Figure 4:
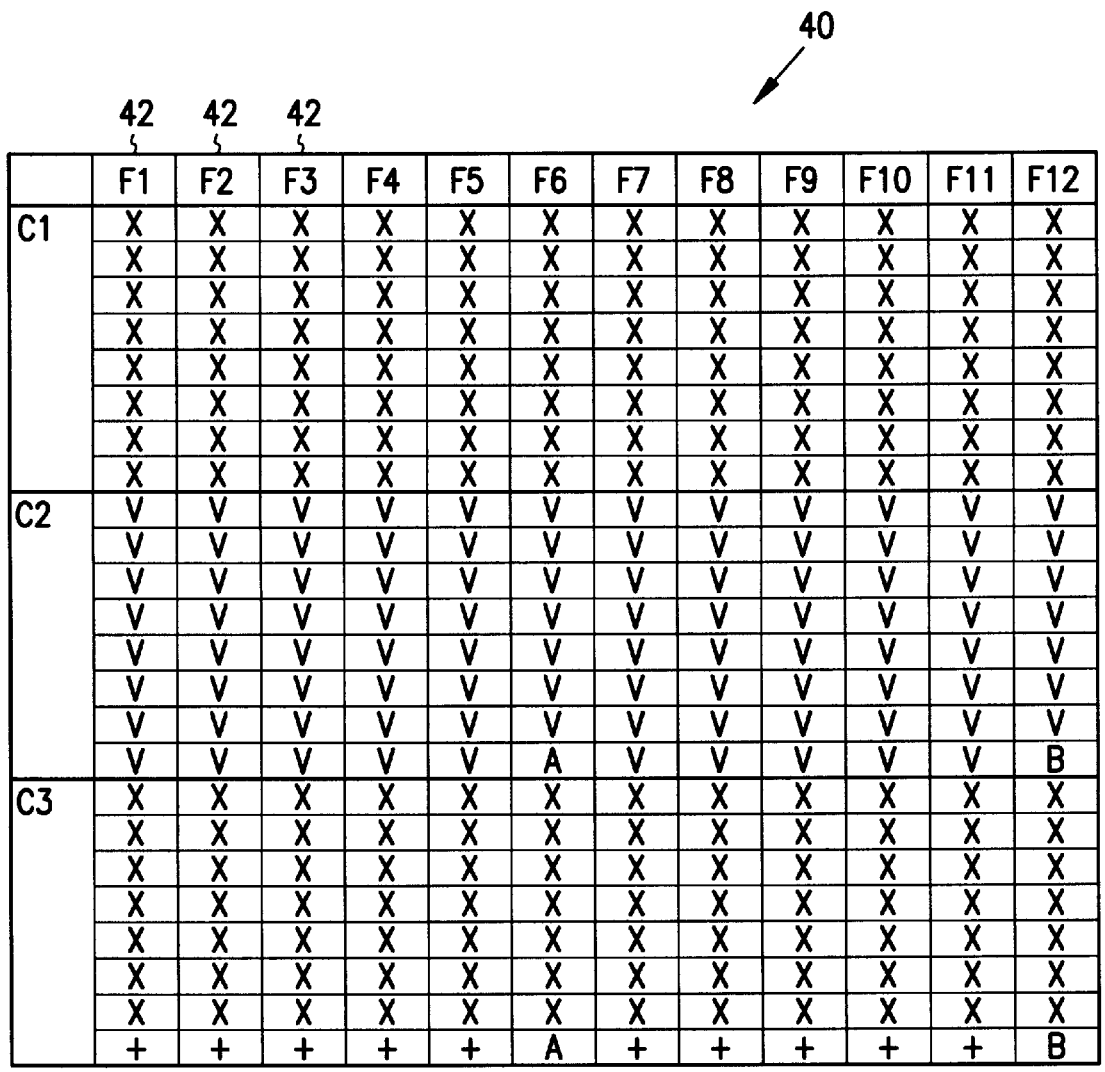
FIG. 4 is a chart showing different details of the extended superframe of FIG. 3.
Figure 5:
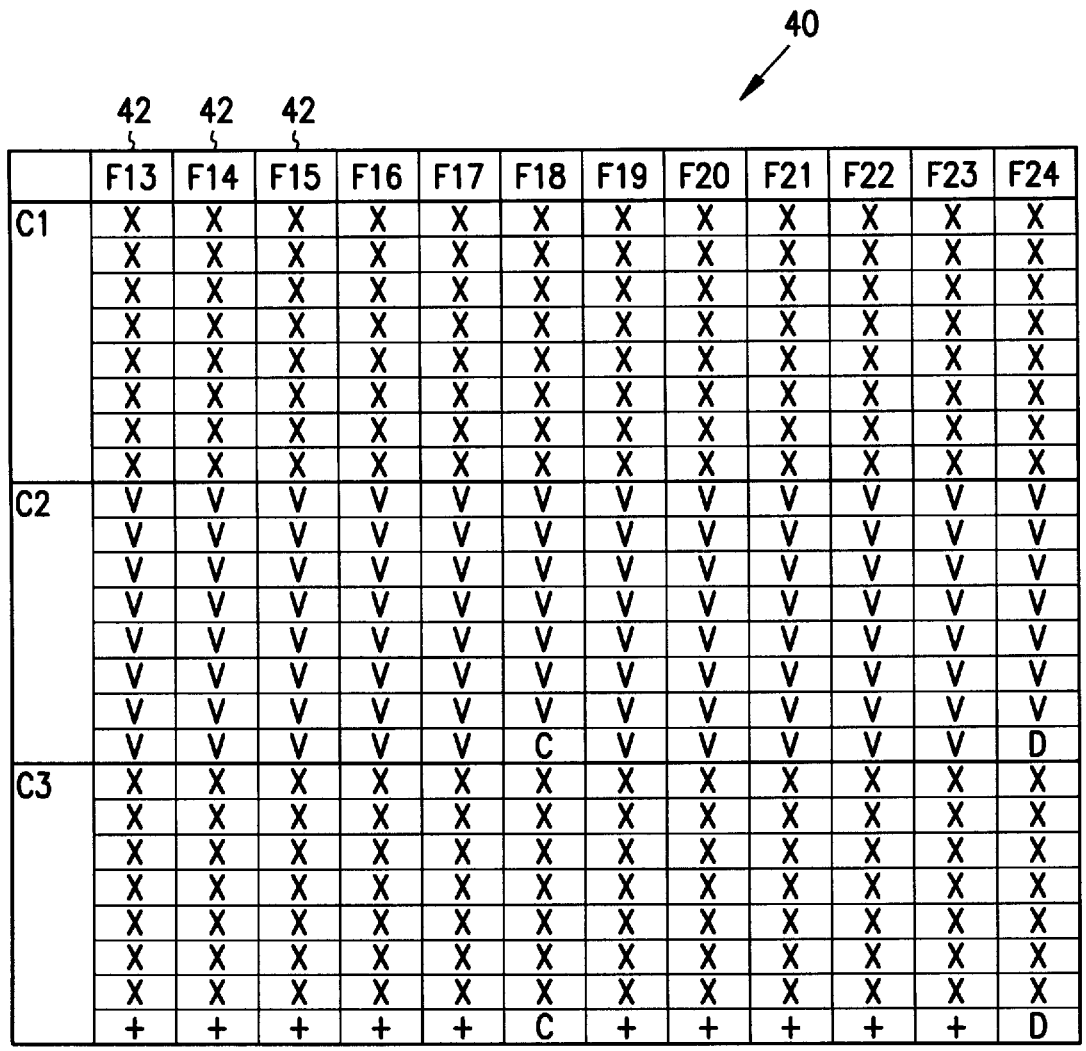
FIG. 5 is a chart showing the same detail level of the extended superframe of FIG. 4, but for different frames.

Referring now to FIGS. 4 and 5, a portion of the ESF frame 40 of FIG. 3 is shown in more detail. FIG. 4 shows the bit use of representative channels C1, C2, and C3 in frames F1 through F12. Similarly, FIG. 5 shows the bit use of channels C1, C2, and C3 in frames F13 through F24.

Representative channel C1 is configured as a dedicated, unswitched data channel. Since no signaling information is required in this type of dedicated channel, the channel C1 does not contain any robbed-bit signaling bits. Instead, every bit location in ESF 40 for channel C1 contains unswitched data, as is shown in FIGS. 4 and 5 by the letter 'x'.

In contrast, channels C2 and C3 have been configured to carry switched data and therefore contain the robbed-bit signaling bit. These bits are shown in the least significant bit location (the bottom bit) for channels C2 and C3 in frames F6, F12, F18, and F24. The signaling bit in frame F6 is usually called the A signal bit, and is designated in FIG. 4 with the letter A. Similarly, the bit in frame F12 is the B signal bit, the bit in frame F18 is the C signal bit, and the bit in frame F24 is the D signal bit.

Although these four bits are available for communicating signaling information on every switched channel 44 in ESF 40, current communication protocols use only the first two signal bits, A and B. Signal bits C and D are not utilized, and are traditionally set to equal signal bits A and B respectively. Consequently, signal bits C and D are referred to as the redundant signaling bits.

Channel C2 in FIGS. 4 and 5 is shown containing voice data, as indicated by the letter 'v' in the bit locations. Note that the least significant voice data bit in frames F6, F12, F18, and F24 have been replaced ("robbed") by the robbed-bit signaling bits. The loss of the least significant voice data bit in every sixth frame for signaling information generally goes unnoticed in voice communications. As a result, the voice digitizer (not shown in the figures) that assigns the bit values for a data channel can fill every bit assignment on the basis of the analog to digital transformation, and let the signaling bit simply overwrite the data as needed.

In data communications, however, the systematic corruption of bits is unacceptable. Traditionally, this has meant that switched data channels that carry non-voice data utilize only the most significant seven bits in each frame. This has the unfortunate effect of limiting switched data communications to a 56 k bps bandwidth, compared to a 64 k bps bandwidth available when all eight bits are used.

The present invention partially overcomes this limitation, as is shown in connection with channel C3. Channel C3 is configured to transmit switched data, and therefore contains robbed-bit signaling bits A, B, C, and D in frames F6, F12, F18, and F24, respectively. However, channel C3 in FIGS. 4 and 5 is shown in a disconnected state (otherwise known as an inactive, idle, or on-hook state). As a result, rather than carrying voice data, channel C3 is carrying unswitched data as part of the variable bandwidth unswitched data path (figure number 20 in FIGS. 1 and 2). The individual bits that make up the unswitched data on channel C3 are shown in the figures by the 'x' and the '+' character. For the purposes of the data stream, there is no difference between bits shown as an 'x' and bits shown as a '+'. The difference in the figures is made for the sole purpose of explaining the functioning and best mode of the invention.

The 'x' bits in channel C3 are found in the seven most significant bits. Traditionally, these are the only data bits that would be sent on a switched data path, for fear of overwriting valid data with the robbed-bit signaling bits A, B, C, and D. However, given the limited use of the present invention on the local loop, it is possible to place data bits in the least significant bit position for the twenty frames in ESF 40 that do not carry robbed-bit signaling bits. These data bits are represented in channel C3 as '+' characters. By utilizing these bits to transmit data, the bandwidth of channel C3 becomes 62.67 k bps (an average of 7⅞ bits per frame, times 8000 frames per second).

It is normally inadvisable to utilize these bits when transmitting data over switched channels across multiple nodes of a telecommunication system. This is because it is possible for frames to be disassembled from one multiframe and reassembled into another multiframe during transmission across a node. As a result, the frames that contain robbed-bit signaling would change during transmission. However, since the present invention is limited to transmission over the local loop, the invention can guarantee that no re-multiframing will take place during transmission. As a result, the frames that contain robbed-bit signaling do not change, and other frames are free to utilize the least significant bit for transmitting data.

It should be noted that channels C2 and C3 could carry switched digital data instead of voice data when they are in a connected state (otherwise known as an active, busy, or off-hook state). When carrying switched digital data, it is possible that the data transmission equipment will transmit at only 56 k bps, since the switched digital data transmission will continue on past the local loop onto multiple nodes of the telecommunications system. While the current invention does not improve bandwidth in these cases, the ability to utilize switched channels C2 and C3 to transmit unswitched data at 62.67 k bps is a significant advantage over the prior art.

Invention Components

Figure 6:
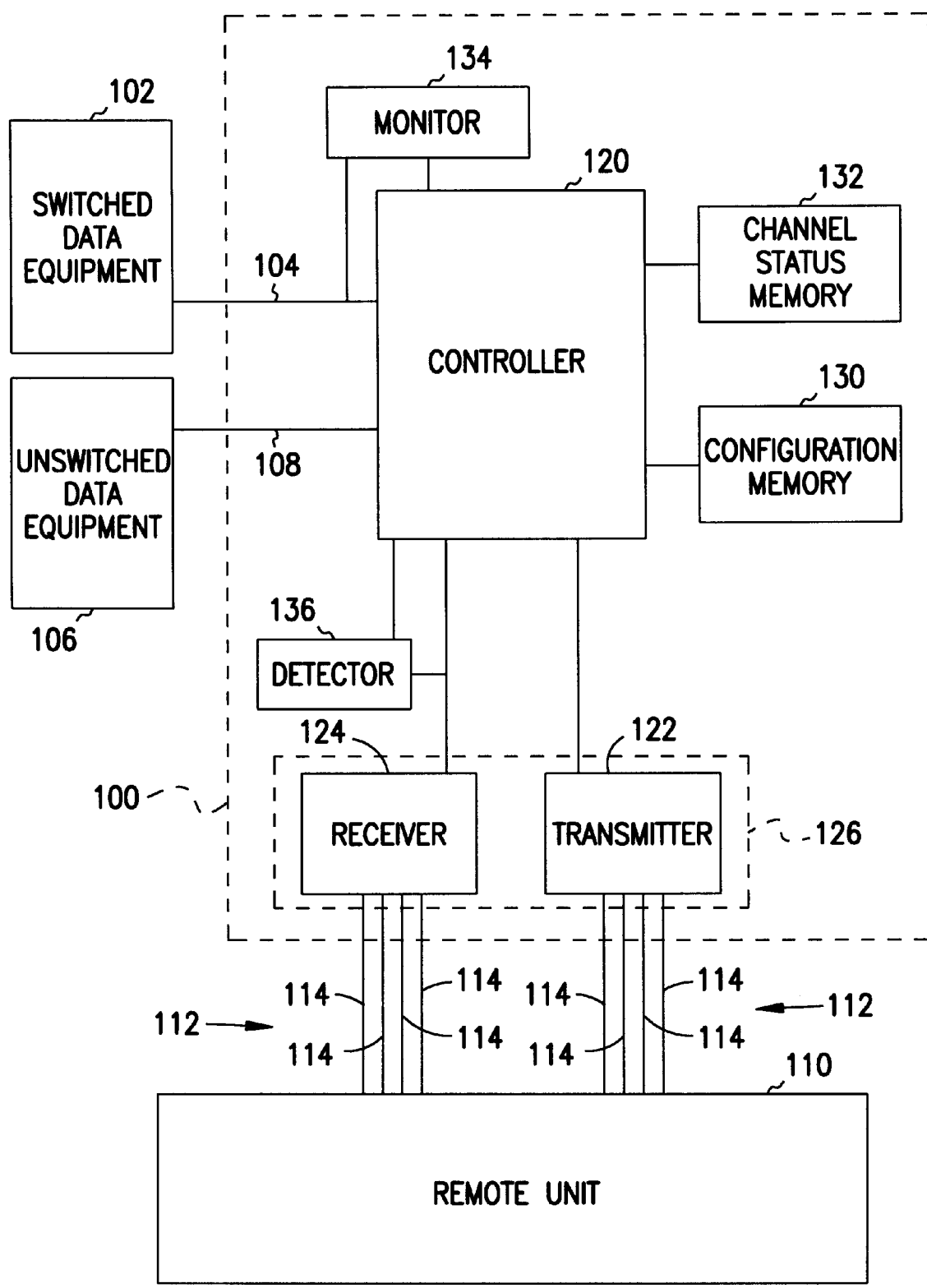
FIG. 6 is a block diagram showing the major elements of the present invention.

FIG. 6 schematically shows a transmission device 100 of the present invention. Device 100 is locally connected to switched data equipment 102 through a switched data interface 104. The device 100 is ideally designed to support a variety of switched data interfaces 104, including T1, E1, ISDN PRI, ISDN BRI, POTS FXO, and POTS FXS.

Device 100 is also locally connected to unswitched data equipment 106 through an unswitched data interface 108. The unswitched data interface 108 utilized by the device 100 can vary widely. For instance, the unswitched data interface 108 could have a 10BaseT connection for connecting to traditional unswitched data networks (such as IP or IPX). In addition, the preferred embodiment of unswitched data interface 108 should be able to connect to Frame Relay and ATM, and have 802.1d Bridging, T1 /DDS connections, and allow V.35 Synchronous communications. Preferably, the device 100 located at a central telephone office would offer an unswitched data interface 108 having wider capabilities than a device 100 located at a customer's premise.

The device 100 is designed to provide communication between local equipment 102, 106 and a similarly designed remote unit 110. Communication with the remote unit 110 takes place over a channelized, digital transmission carrier 112, such as a T1 or E1 line. Carrier 112 is divided into separate channels 114, created by dividing carrier 112 through time division multiplexing.

Communications between switched data equipment 102 and carrier 112 are controlled within the device 100 by controller 120. Data to be transmitted from the switched data equipment 102 is received by controller 120 and sent over carrier 112 via transmitter 122. Once received by the remote unit 110, the switched data is delivered to remote switched data equipment (not shown) connected to the remote unit 110. When the remote switched data equipment in turns sends data to switched data equipment 102, the data is received over carrier 112 by controller 120 through a receiver 124, and then is directed by controller 120 to switched data equipment 102.

The transmitter 122 and the receiver 124 form part of a carrier interface 126 that is specially configured to handle traffic over carrier 112. The device 100 is ideally designed to support a variety of carrier interfaces 126, such as T1, E1, HDSL, SDSL, and VDSL.

Similarly, communication between unswitched data equipment 106 and remote unswitched data equipment (not shown) attached to the remote unit 110 takes place over carrier 112, transmitter 122, and receiver 124, all under the control of controller 120.

The controller 120 could consist of a central processing unit and a control program stored in program memory. Alternatively, the controller 120 could comprise hard wired circuits designed to handle the control logic set forth below. In the preferred embodiment, the controller 120 is comprised of hard-wired logic gates, in order to speed up processing of data transmission and reception.

The controller 120 is in communication with configuration memory 130, which stores the configuration of the channels 114 of carrier 112. For each channel 114, the configuration memory 130 will indicate whether the channel 114 is to operate in a dedicated or a switched mode. As a default, configuration memory 130 can be set so all channels 114 operate in a switched mode. Local configuration of the configuration memory 130 is ideally allowed, as is configuration across a local network or via carrier 112. Remote configuration of equipment such as device 100 and configuration memory 130 is well-known in the prior art, and is possible utilizing such protocols as SNMP.

Controller 120 is also in communication with channel status memory 132. Channel status memory 132 indicates the transmit status and the receive status of each channel 114 configured by configuration memory 130 to operate in a switched mode. If the transmit status for a channel 114 is active, then data for transmission on that channel will be received from switched data equipment 102. Likewise, if the receive status for a channel 114 is active, data received from receiver 124 for that channel 114 will be directed to switched data equipment 102.

In contrast, if the transmit status for a channel 114 is inactive, then data for transmission on that channel 114 will be received from unswitched data equipment 106. Data received from receiver 124 for inactive receive status channels 114 will be directed to unswitched data equipment 106.

It is possible for the transmit status for a channel 114 to be set to active, and the receive status of the same channel 114 to be set to inactive, or vice versa. This may occur, for instance, when a voice call is first initiated. This situation causes no confusion in the data stream, and actually is advantageous since unswitched data is able to travel along a channel 114 in one direction until the channel 114 actually requires switched data to travel in both directions.

The receive and transmit status in channel status memory 132 is irrelevant for channels 114 configured in configuration memory 130 to operate in dedicated mode. Channels 114 operating in dedicated mode always take data for transmission from unswitched data equipment 106, and will always direct received data to unswitched data equipment 106.

In order to detect a change in status for local switched data equipment 102, a local connection monitor 134 in device 100 monitors communication on switched data equipment interface 104. The monitor 134 determines when a change in status occurs for switched data equipment 102, and so informs controller 120. The monitor 134 is shown physically separate from controller 120 in FIG. 6. However, it would be possible to incorporate the monitor 134 into controller 120 either by including the functions of the monitor 134 in the control program for controller 120, or by hard-wiring the functions of the monitor 134 into controller 120.

Similarly, channel status signal detector 136 monitors data received by receiver 124 on channels 114 configured for switched data operation. When the detector 136 determines that there is a change in the status for data received on the channel 114, the detector 136 so informs the controller 120. As was the case with monitor 134, detector 136 is shown separate from controller 120 in FIG. 6, but could be incorporated into the controller 120 without changing the scope of this invention.

Robbed-Bit Signaling Embodiment

The components for implementing the invention are set forth above in connection with FIG. 6. One embodiment using these components utilizes robbed-bit signaling.

In the robbed-bit signaling embodiment, transmission over channels 114 configured for dedicated unswitched data operation is straight-forward. The controller 120 takes all of the data for the dedicated channel 114 from the unswitched data equipment 106. No robbed-bit signaling bits are sent in dedicated channels 114.

In non-dedicated channels 114, robbed-bit signals will be sent on the channel 114. This is true even if a channel 114 is currently idle and is temporarily being utilized to transmit unswitched data. The determination of data source for data transmission on non-dedicated channels 114 is determined by the status for that channel 114 stored in status memory 132. When the non-dedicated channel 114 is idle, data for transmission is accepted from the unswitched data equipment 106. When the status of the non-dedicated channel 114 is active, data is taken from the switched data equipment 102.

In addition to data, each ESF of data for a non-dedicated channel contains four robbed-bit signaling bits. Three of these robbed-bit signaling bits are transmitted as normal, these being robbed-bits A, B, and redundant robbed-bit D. The values for these bits are either presented by switched data equipment 102 or are created by controller 120 based upon the status information received by monitor 134. Either way, the creation of these robbed-bit signaling bits is well-known in the prior art. In place of redundant robbed-bit C, the controller 120 inserts the value of the transmit status for the channel 114 as stored in channel status memory 132. Since the transmit status for each channel 114 can be only one of two values, the length of the transmit status is only a single bit.

These non-data bits A, B, C, and D are present even if the status of the non-dedicated channel 114 is idle. These bits represent the status of the channel 114 taken from the switched data equipment 102, even though the remainder of the channel 114 contains data from the unswitched data equipment 106.

When receiving data, the controller 120 receives data from the receiver 124 according to the configuration and status for each channel 114. If a channel 114 is configured for dedicated operation, all of the data received on the channel 114 is directed to the unswitched data equipment 106 by the controller 120. Otherwise, if the channel status is idle (and the switched channel is therefore receiving unswitched data), the controller 120 presents the non-signaling bits (all bits other than robbed-bit signaling bits A, B, C, and D) to the unswitched data equipment 106. If the channel 114 is in switched (non-dedicated) configuration and has an active status, the controller 120 receives data from receiver 124 and reinstates the C signaling bit by setting the C bit equal to the A signaling bit. The received data is then presented to the switched data equipment 102.

During receipt of an extended superframe, the detector 136 waits for the appearance of a channel status bit (the C robbed-bit signaling bit) on the incoming data. Upon receipt of this bit, the detector 136 provides the bit to the controller 120, which uses the bit to reassign the receive status for the current channel 114 in the channel status memory 132. Note that the received channel status bit updates the receive status in the channel status memory 132 even if there is no change in the status. Alternatively, the controller 120 could compare the incoming channel status bit with the receive status in the channel status memory 132, and update the channel status memory 132 only on an actual change in receive status.

The status bit received by the detector 136 indicates the receive status for the current channel 114 in the next ESF, and does not change how the controller 120 handles the ESF currently being received. On receipt of each ESF from remote unit 110, controller 120 will handle the ESF data for switched channels 114 according to the receive status for the channels 114 as received in the prior ESF.

Figure 7:
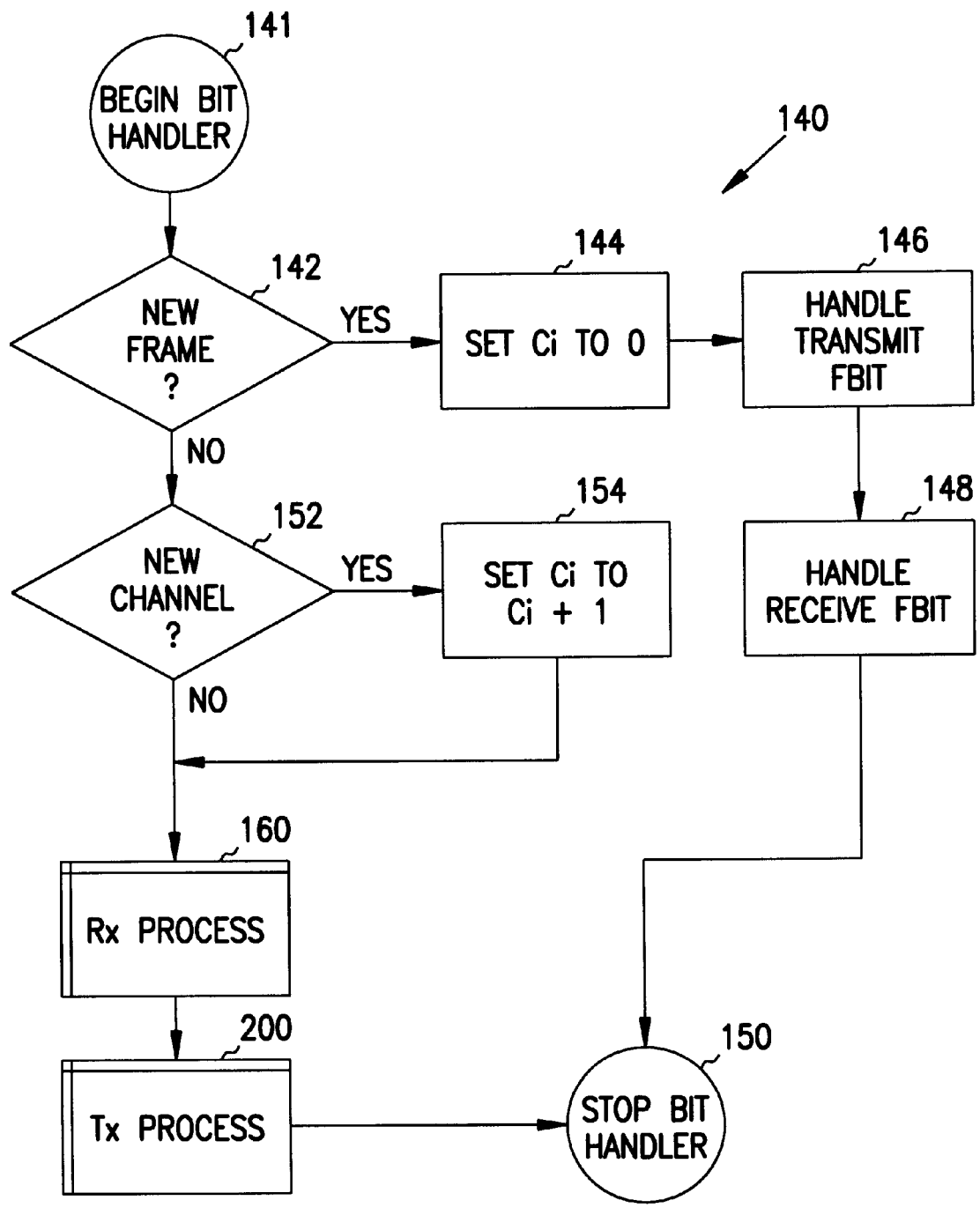
FIG. 7 is a flow chart showing the bit handler routine.

The procedures for transmitting and receiving data are set forth in more detail in the flow charts shown in FIGS. 7 through 10. FIG. 7 shows the general bit handler routine 140. The routine 140 is executed to handle a transmit bit and a receive bit. Under the bit handler routine 140, the beginning of each transmitted frame is in sync with the beginning of each received frame. Although it would be possible to handle transmit and receive frames without it, such synchronization is standard in the industry. Temporary storage for transmit and receive characters can be provided in connection with transmitter 122 and receiver 124 in the form of character buffers (not shown), as is well-known in the prior art.

The entire bit handler routine 140 is repeatedly executed by controller 120. Between each iteration, routine 140 prepares itself to handle the next transmit and receive bits. The controller 120 is capable of counting the bits transmitted and received, and hence the bit handler routine 140 is able to determine when new channels, frames, and multiframes begin.

The beginning of the bit handler routine 140 is shown as at flowchart position 141. The first actual step 142 in routine 140 is to determine whether the current bit is the first bit in a new frame. If so, the channel index, indicated by the variable name Ci in the Figures, is reset to zero, as shown in step 144. After this, the bit handler routine 140 handles the transmission and reception of the frame bit (Fbit) in steps 146 and 148, respectively. Frame bit determination and handling is well-known in the prior art, and is not discussed further herein. After handling the frame bit, the bit handler routine stops, as shown by flowchart location 150.

If step 142 indicates that a new frame is not beginning, step 152 is executed to determine if a new channel has begun. If so, step 154 serves to increment the channel index Ci. Whether or not the channel index is incremented, the receive process 160 and the transmit process 200 are then executed for the current bit. After receiving and transmitting a bit through processes 160, 200, the bit handler routine stops at location 150.

Figure 8:
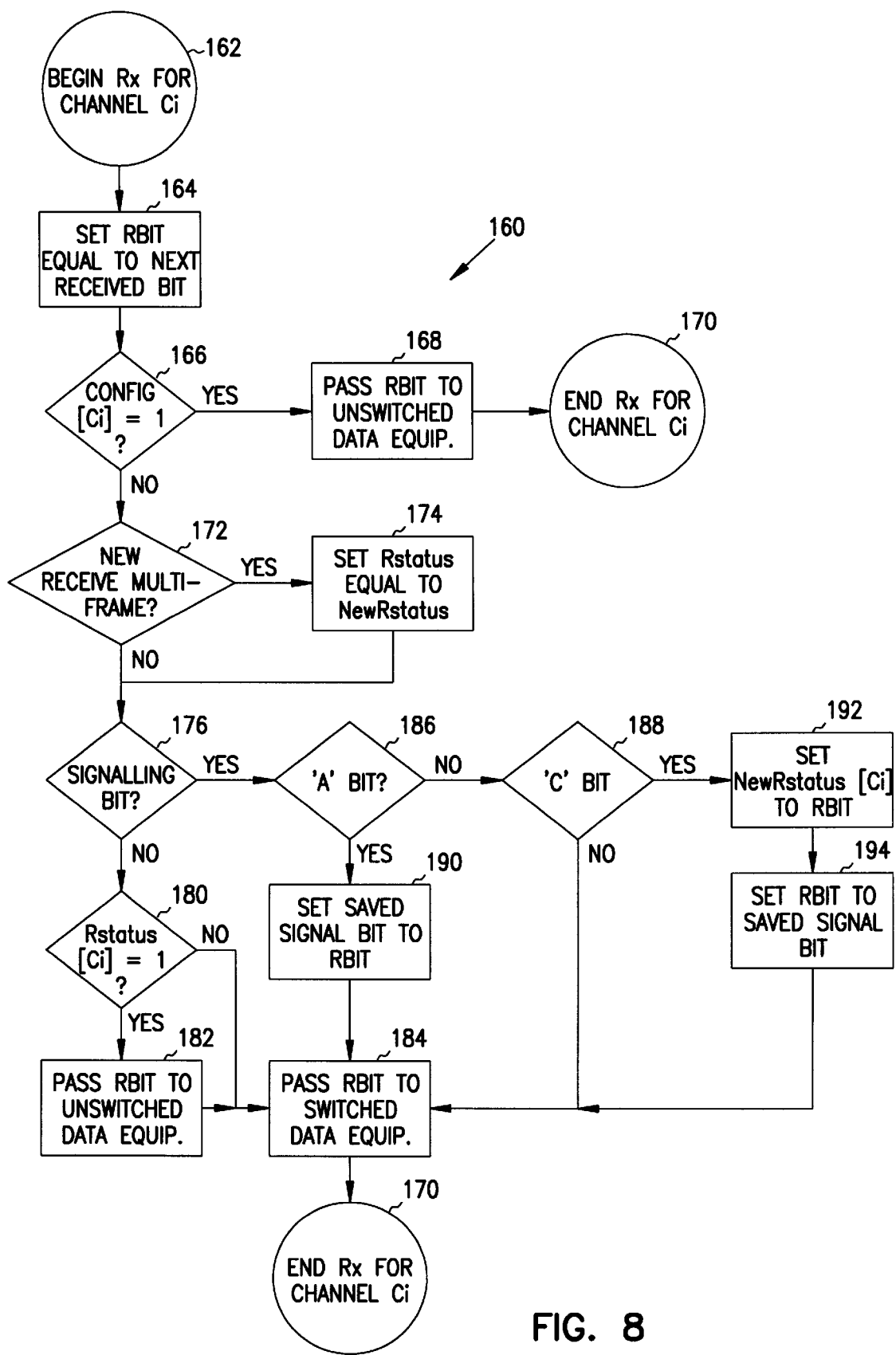
FIG. 8 is a flow chart showing the receive bit routine.

The receive process 160 is shown in FIG. 8, and begins at 162. The controller 120 receives the next bit from receiver 124 and assigns the bit value to RBIT, in step 164. The receive process 160 next determines if the current channel Ci is dedicated to unswitched data by checking configuration memory 130, as shown by query 166. If the value of the Config variable for channel Ci is equal to '1', then the channel is configured for unswitched data. If set to '0', the channel carries signaling and may carry either switched or unswitched data. If Config[Ci] is equal to '1', RBIT may be passed directly to the unswitched data unit 106 in step 168, and the receive process 160 can terminate at flowchart location 170.

If channel Ci is configured for switched data, the receive process continues by determining if the RBIT forms the beginning of a new receive multiframe, in step 172. If it does, it is necessary to update the receive status variable to the updated status created during the previous multiframe. This is done by setting the receive status variable Rstatus to the value of new receive status variable NewRstatus in step 174.

Whether or not Rstatus is updated, the receive process 160 must then determine whether RBIT is one of the four robbed-bit signaling bits in step 176. This determination is made by the controller 120 using standard prior art techniques. If RBIT is not a signaling bit, Rstatus for current channel is checked to determine whether the channel is currently active (carrying actual switched data) or is inactive (forming part of the unswitched data path), as shown in step 180. If the Rstatus for the channel is '1', the channel is inactive and RBIT is passed to unswitched data equipment 106 in step 182. If the Rstatus for the channel is '0', the channel is active and RBIT is passed directly to switched data equipment 102 in step 184. In FIG. 8, the step executed after passing RBIT to unswitched data equipment 106 (step 182) is also step 184. Although it would appear illogical to pass the same bit to both sources, the switched data equipment 102 will simply ignore all data bits it receives on channel Ci when that channel is inactive. In the preferred embodiment, all data bits received on a channel configured for switched data handling are automatically made available to switched data equipment 102. Hence, extra effort would be required to hide such data bits, and the extra effort is not needed. It would of course make no difference to the receive process 160 if the step executed after step 182 were the termination of the process in step 170.

If step 176 determines RBIT to be a signaling bit, receive process 160 must determine if this is either the A or C bit, as seen in steps 186 and 188 respectively. If it is neither, the signaling bit is passed directly on to the switched data equipment 102 in step 184 and the receive process ends at step 170. If step 186 determines that RBIT is the A signaling bit, it is necessary to temporarily save the value of this bit, as shown in step 190. This temporary value will be used to reset the C signaling bit to its original value (the redundant value of the A bit) before it is passed on to switched data equipment 102. After the value of the A bit is saved in step 190, RBIT is passed to switched data equipment 102 in step 184 and the process ends.

If step 188 determines that RBIT contains the C signaling bit, then receive process 160 knows that RBIT contains the channel status signal for channel Ci. As a result, NewRstatus for channel Ci is set to equal RBIT in step 192. RBIT is then set to the temporarily stored value of the A signaling bit in step 194, and then passed on to switched data equipment 102 in step 184.

In this preferred implementation of receive process 160, the functions of detector 136 (detecting the channel status bit) have been combined with the receive bit handling aspects of controller 120. In essence, the controller 120 has incorporated all aspects of the detector 136.

As can be seen from receive process 160 in FIG. 8, signaling bits received on a switched data channel are never forwarded to unswitched data equipment 106, even if the channel is inactive and currently carrying unswitched data. In effect, the signaling bits are filtered out of the data stream heading for unswitched data equipment 106.

Figure 9:
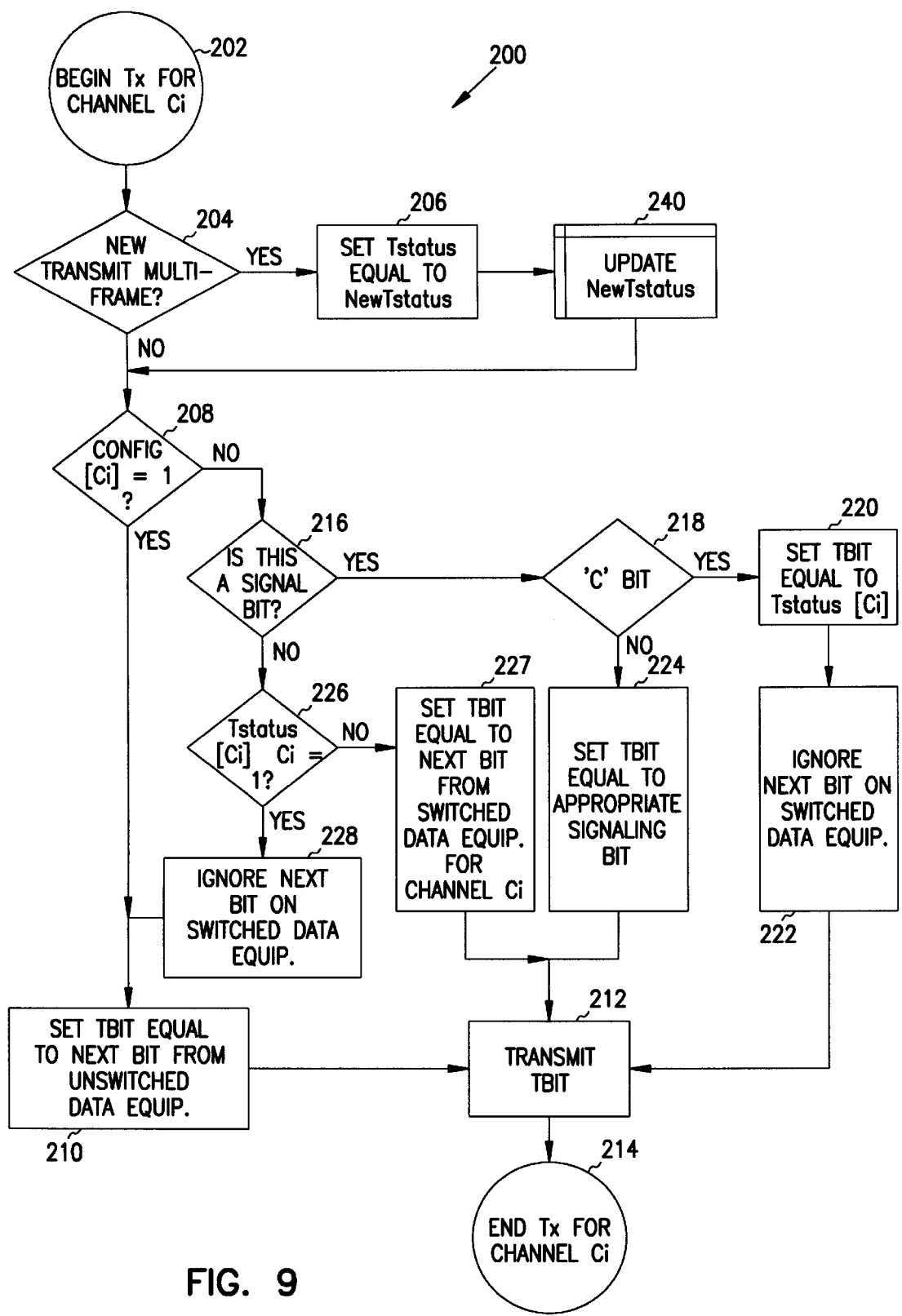
FIG. 9 is a flow chart showing the transmit bit routine.

FIG. 9 shows the transmit process 200 in flowchart form. Transmit process 200 is shown starting at flowchart location 202. The first functional step in transmit process 200 begins at 204, where the transmit process 200 determines if the current bit to be transmitted will be the beginning of a new multiframe. If so, it is necessary to update the transmit status variable to the updated status created during the previous multiframe. This is done by setting the transmit status variable Tstatus to the value of new transmit status variable NewTstatus in step 206.

Unlike the receive process 160, the transmit process 200 cannot update its new status variable NewTstatus merely by examining channel status bits created by the remote unit 110. Instead, transmit process 200 must set NewTstatus by receiving status information from the local switched data equipment 102, which is accomplished in process 240 and is explained in more detail in connection with FIG. 10.

After NewTstatus is updated, or if step 204 determines that the current bit is not the start of a new multiframe, step 208 is executed to determine if channel Ci is configured as dedicated to the handling of unswitched data. If it is, Config[Ci] will equal '1', and step 210 will set TBIT equal to the next bit available from the data unit. TBIT is transmitted across channel 114 in step 212, and the transmit process 200 terminates as indicated by flowchart location 214 in FIG. 9.

If Config[Ci] is '0', channel Ci is configured to carry switched data and step 216 is executed to determine if the next bit is one of the four robbed-bit signaling bits. If yes, a determination is made whether the signaling bit is the C bit. If step 218 determines it is the C bit, step 220 sets TBIT to the current transmit status for channel Ci (Tstatus[Ci]).

In some circumstances, switched data equipment 102 itself generates signaling bit C and is ready to present this bit to controller 120. In these circumstances, transmit process 200 will receive and ignore the next bit presented by switched data equipment 102 for channel Ci in step 222. TBIT is then transmitted in step 212, and transmit process 200 terminates at location 214.

If step 218 determines that the status bit being sent is not the C bit, then TBIT is set to equal the appropriate robbed-bit signaling bit (A, B, or D). This is accomplished either by receiving the robbed-bit signaling bit as the next available bit from the switched data equipment 102, or by determining the robbed-bit signaling bit from status information about the channel 114 given to controller 120 from the switched data equipment 102. The procedure that is utilized depends upon the switched data equipment 102 utilized. A PBX system will generate its own robbed-bit signaling bit, while an ordinary telephone on a POTS line would require the controller 120 to generate the signaling bits. Obtaining the robbed-bit signaling bits occurs in step 224.

Note that this step will handle the transmission of status bits even if the status for channel Ci is inactive and channel Ci is sending unswitched data (Tstatus[Ci] =1). Either way, the actual status of the channel maintained by the switched data equipment 102 will be sent to remote unit 110.

If step 216 determines that the current bit is not a signal bit, the status of the channel 114 is checked in step 226. If Tstatus[Ci] is '1', then the channel 114 is inactive and the next bit of data should be taken from unswitched data equipment 106. In this case, transmit process 200 first receives and ignores the next bit made available from switched data equipment 102, as shown in flowchart element 228. After that, the next bit from unswitched data equipment 106 is transmitted, as shown in step 210. If Tstatus[Ci] is '0', then the channel 114 is active and the next bit of data should be taken from switched data equipment 102, as shown at step 227. This bit is then transmitted in step 212, and transmit process 200 terminates at step 214.

It should be noted at this point that some ESF 24-frame multiframes are created by simply combining two 12-frame multiframes. In these circumstances, the C and D robbed-bit signaling bit are not always set equal to the A and B bit. Rather, the C and D bit represent the signal found in the second 12-frame multiframe. As a result, the process shown in FIG. 8 must be slightly altered. The C bit will still be used to send the channel status signal. However, in this circumstance it is necessary to set the D bit to equal the B bit on transmission. To accomplish this, the transmit process 200 must save the B bit on transmission, and replace the D bit with the saved value of the B bit. In this way, when the C bit is reset to equal the A bit on reception (shown in FIG. 8), the combined C and D bits will be equal to the A and B bits, and therefore will be assured to contain a valid signal. If the D bit were not set to the value of the B bit, the setting of the C bit to equal A on reception might create a spurious A-D signal in the second 12-frame multiframe. Although the actual C-D signal originally sent in the second 12-frame multiframe is lost in this process, the next multiframe would almost certainly include this signal. Thus, the C-D signal is delayed only one multiframe. This implementation of the transmit process 200 is generally preferred, since it is useful in connection with more multiframing techniques. Although the original C-D signal is not an exact duplicate of the A-B signal in multiframes of this type, the C-D bits are still referred to as redundant robbed-bit signaling bits in this application.

Figure 10:
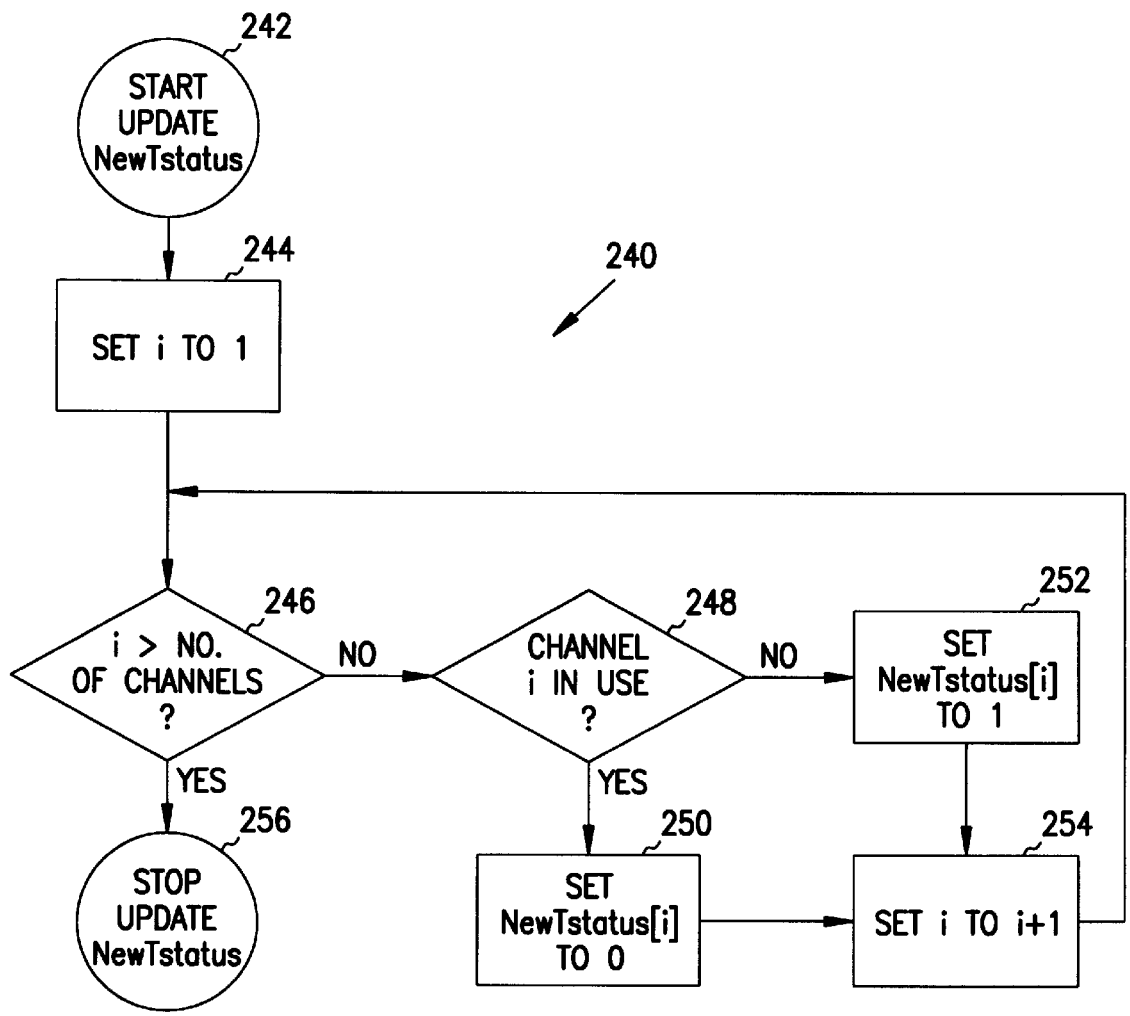
FIG. 10 is a flow chart showing the update NewTstatus routine.

FIG. 10 shows the update NewTstatus routine 240, starting at flowchart location 242. The first step 244 of NewTstatus routine 240 is to reset counter i to one in step 244. If i is not yet greater than the number of channels 114 in carrier 112, as determined in step 246, the NewTstatus routine 240 must determine whether channel number i is currently in use to transmit switched data. This determination, shown in FIG. 10 at step 248, is the heart of the NewTstatus routine 240. However, the actual procedure used to make this determination is highly dependent on the actual switched data equipment 102 connected to the device 100.

To accomplish the task at step 248, NewTstatus routine 240 will have to actively monitor the switched data equipment 102 or the switched data signaling occurring across the channels 114. In most cases, NewTstatus routine 240 will simply monitor signaling from switched data equipment 102 to determine when the transmit status for a channel 114 has changed. In some cases, however, the determination of transmit status for a channel 114 is more complicated. For instance, it is common for a phone going off-hook to only produce a robbed-bit signaling change in one direction. This is because the switched data equipment 102 in a central office does not change the robbed-bit signaling sent to a customer in response to a phone being picked up at the customer's site. Nevertheless, the customer must receive a dial tone from the central office, which is only possible if the transmit status at the central office is active for that channel. In this case, the NewTstatus routine 240 in the device 100 located at the central office will recognize the phone off-hook indication received from remote unit 110 across channel 114, and will set the transmit status for the appropriate channel 114 to active.

In addition, some circumstances require the bandwidth in one direction to perform on-hook transmission, such as when a telephone rings. On-hook transmissions are commonly used to provide caller-ID information to the called party before answering. In this case, the NewTstatus routine 240 would set the transmit status for that channel to active at the beginning of the ring cycle, in order to make sure that caller-ID information is transmitted properly to remote unit 110. Even if the call is not answered, NewTstatus routine 240 would not return the transmit status to inactive until after a specified amount of time, given in frame or multiframe intervals, after the end of the last ring. This waiting time is required because often there is no signaling from the switched data equipment 102 at a central office to indicate that a call has been abandoned.

These types of special circumstances are highly dependent on the particular type of switched data equipment 102 utilized. The NewTstatus routine 240 should include this type of switched data equipment 102 specific logic for each type of switched data equipment 102 supported. The determination of status for each type of equipment 102 is known in the prior art for the equipment.

After the determination is made at step 248, the value of NewTstatus for this channel is assigned. If channel i is in use, NewTstatus[i] is set to zero in step 250. If not, NewTstatus[i] is set to one in step 252. Either way, the value of count i is then incremented in step 254, and the check in step 246 is re-executed. If step 246 determines that count i exceeds the number of channels, the NewTstatus routine 240 terminates as shown at flowchart location 256.

The NewTstatus routine 240 contains much of the logic found in the monitor 134. By including the routine 240 within the programming or circuitry of the controller 120, the monitor 134 is effectively absorbed by the controller 120.

Direct Monitoring Embodiment

Another method of utilizing the components of FIG. 6 is through the use of time delay calculations and direct monitoring of existing channel signaling. In this method, a channel status bit does not need to be inserted in place of robbed-bit signaling bit C. Rather than explicitly informing a remote unit 110 of a change in status of a switched data channel 114 in this manner, the remote unit 110 of this embodiment senses the change by monitoring normal channel signaling communication.

One method of channel signaling is through the use of robbed bit signaling. Thus, rather than reading a C bit that has been altered by remote unit 110, the detector 136 would sense a need to change the receive status of a channel by monitoring the A and B bit. This is inherently more complex than utilizing the C robbed-bit signaling bit to transfer information, since the detector 136 would have to interpret the four status states possible with the A and B bit, and determine which status state indicates a needed change in the receive status stored in channel status memory 132. Nevertheless, this embodiment has the advantage of leaving all transmissions over carrier 112 unchanged.

On transmit, the function of the monitor 134 would again depend on the particular switched data equipment 102 utilized. Although the C bit would not be changed into a channel status bit, other aspects of transmission would be the same as that described above in connection with the robbed-bit signaling embodiment.

The bandwidth allocation could be switched exactly on frame or multi-frame boundaries, or at other times depending upon a specific realization of this method. In most cases, bandwidth allocation would occur on the multi-frame received after the detector 136 or monitor 134 detected the status change by monitoring the channel signaling. However, as explained above, it is necessary in some circumstances to utilize a change in the receive status to automatically change the transmit status. The example described above involved a telephone being picked up, and the central office system not expressly altering the status of the channel from the central office back to the customer premises. In these circumstances, when the detector 136 detects the off-hook indication, the device embodying the invention at the central office must alter both the receive status of the channel (indicating that switched data will now be received on that channel from the customer premises) and the transmit status (indicating that the central office will transmit switched data—such as a dial tone—to the customer premises). On the customer premises, the monitor 134 would recognize the phone off-hook indication, and automatically change the transmit channel for the status. The receive status must also be changed, but it cannot change until the invention at the central office has changed its transmit status. There is in effect a time delay that must be computed, so that the switch in status at the customer premises and the central office can occur on the same multi-frame. This problem is of course avoided in the first embodiment using the robbed-bit signaling bits, since a change in the channel signal in the C signaling bit always precedes the multichannel with a changed status.

The time delay actually utilized depends in part on the length of the local loop and any inherent delays built into the system. Typically, the switch in status can occur on the next multi-frame boundary, or the second multi-frame boundary. The actual delay implemented will depend on the actual timing of the device constructed in the particular local loop, although a preset delay of sufficient duration would allow the delay to be implementation independent.

Figure 11:
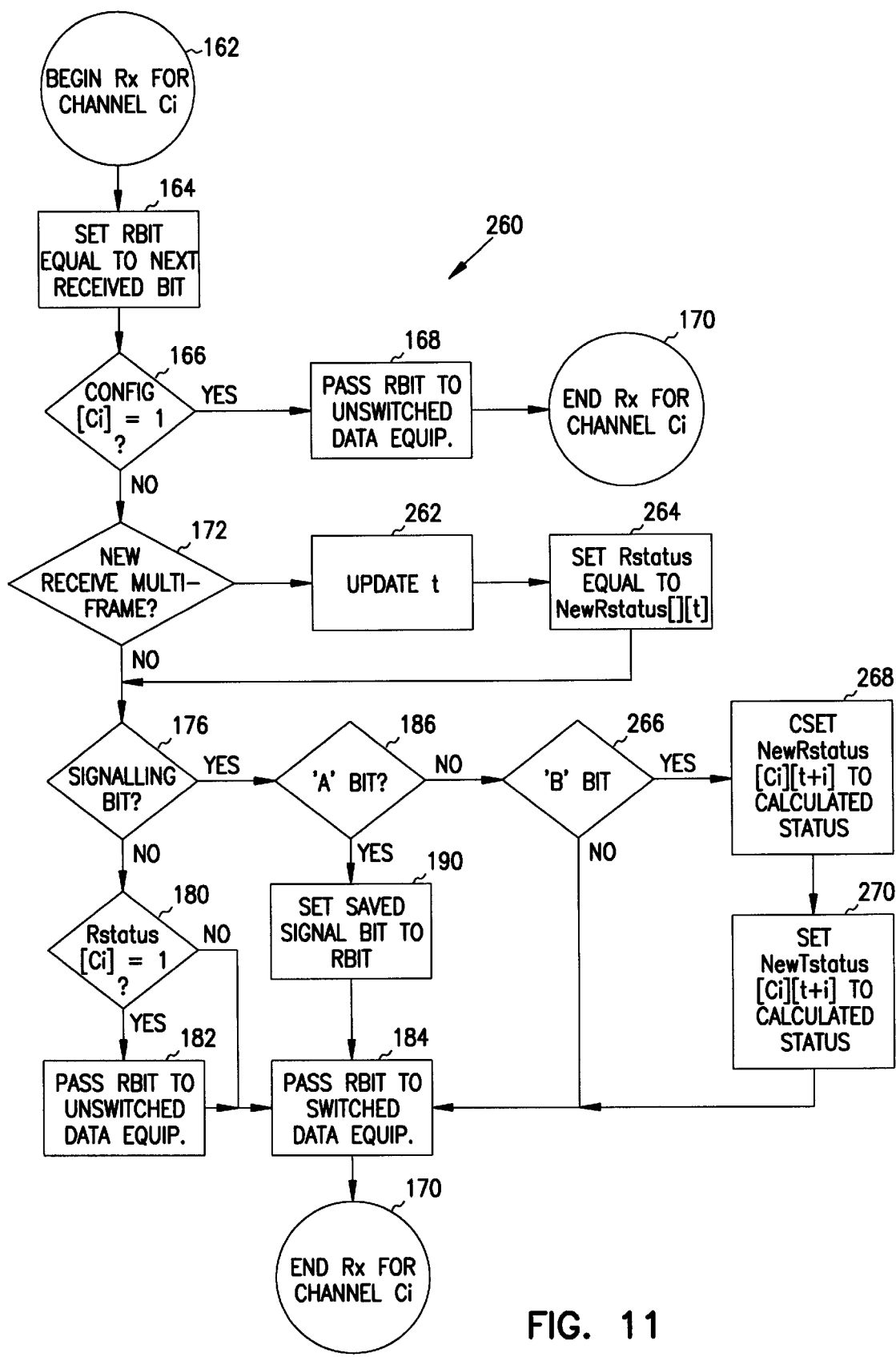
FIG. 11 is a flow chart showing an alternative embodiment of the receive bit routine.

The basic receive routine utilized by the invention in this embodiment would be changed only slightly, as shown in the flow chart for the alternative receive bit routine 260 in FIG. 11. In this figure, the steps of the alternative receive bit routine 260 that are identical to the receive bit routine 160 shown in FIG. 8 are similarly numbered. Thus, the routine starts identically, until it is time to set the new value of Rstatus at the start of a new multiframe. The simple step of setting Rstatus to equal NewRstatus (step 174 on FIG. 8) is replace with two steps. First, in step 262 the current time index is updated. In step 264, Rstatus is now set equal to the NewRstatus for the current value of time index t. This allows the routine 260 to add the necessary time delay before implementing a change in status.

As a result, it would be possible to change the status in one, two, or any number of multiframe boundaries in advance. The setting of future values of the Rstatus variables takes place in steps 266, 268, and 270 of routine 260, which take the place of steps 188, 192, and 194 of routine 160. Unlike the previous routine, where the value of the C robbed-bit signaling bit determine the new status value, routine 260 must calculate the new status value based upon the value of both the A and B status bits. Thus the A status bit is still saved in step 190. However, step 188 (the check for the C bit) is replaced with step 266 (the check for the B bit). When the B bit is received, step 268 can calculate the new status for the channel, based upon standard, prior art robbed-bit signaling standards. This calculated status is then used to set the value of Rstatus for a future multiframe, by setting NewRstatus for a particular channel and time index equal to the calculated value. As shown in FIG. 11 at step 268, the time index is equal to 't+i', where t is the current time index and i is the number of multiframes empirically determined to be necessary to delay implementing the new status. For instance, if the change can take place at the next multiframe boundary, i would equal '1'. If the change should wait for the second boundary, i would equal '2'.

As explained above, the change in the receive status (Rstatus) may sometimes automatically trigger a change in the transmit status (Tstatus). To reflect this, step 270 shows the future value of Tstatus for the current channel (at time index t+i) being altered by the calculated status based upon the A and B robbed-bit signaling bits.

Figure 12:
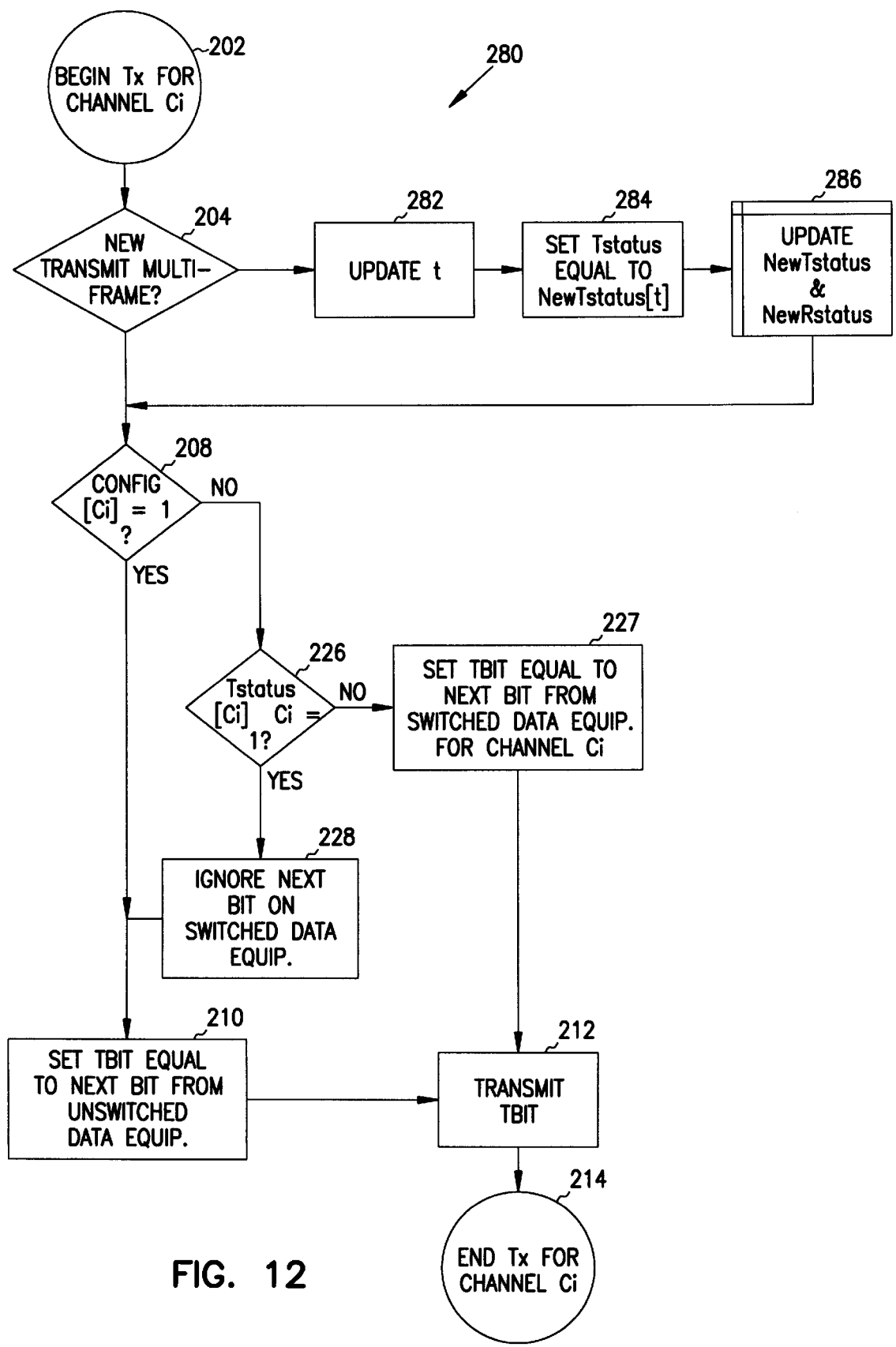
FIG. 12 is a flow chart showing an alternative embodiment of the transmit routine.

The transmit routine 280 for the direct monitoring embodiment is shown in FIG. 12. Those steps in routine 280 that are identical to the steps in transmit routine 200 (shown in FIG. 9) have identical numbering. Like the receive routine 260 for this embodiment, the primary change in the transmit routine 280 is the use of a time index to allowed the delay in implementing a new status. Thus, step 206 in the previous routine 200 has been replaced with steps 282 and 284. Step 282 increments the time index t, and step 284 sets Tstatus to equal the value of NewTstatus for the current time index.

Routine 286, which updates the status values based upon the current operation of the switched communications equipment, is extremely similar to routine 240 from the previous routine 200. Like routine 240, routine 286 sets the value of the new transmit status variable based upon the switched data equipment 102. In addition, routine 286 may also need to set the value for the receive status variable Rstatus under conditions such as those described above. The conditions under which this would be necessary vary greatly depending upon the switched data equipment 102 used. This additional functionality is shown in the label of routine 286 in FIG. 12.

In the direct monitoring embodiment, the robbed-bit signaling bits are transmitted unchanged. As a result, the steps used to replace the C bit in routine 200 (namely, steps 216, 218, 220, 222, and 224) are no longer needed for the transmit routine 280. Hence, FIG. 280 includes a greatly simplified transmit procedure. A determination is made whether the channel is used to transmit unswitched data by examining the configuration for the channel in step 208 or the Tstatus for the channel in step 226. If so, the Tbit to be transmitted is taken from the unswitched data equipment 106 in step 210 and transmitted in step 212. It may be necessary to ignore an incoming bit on switched data equipment 102 as shown in step 228.

If steps 208 and 226 show that switched data will be transmitted, step 227 sets Tbit equal to the next bit on the unswitched data equipment 102. If the signal bits are not automatically generated by the switched data equipment 102, the routine 280 would of course calculate the correct signal bit and insert it appropriately in the data stream, as is described above. Step 212 then transmits this bit.

Dynamic Bandwidth Allocation Equipment

Figure 13:
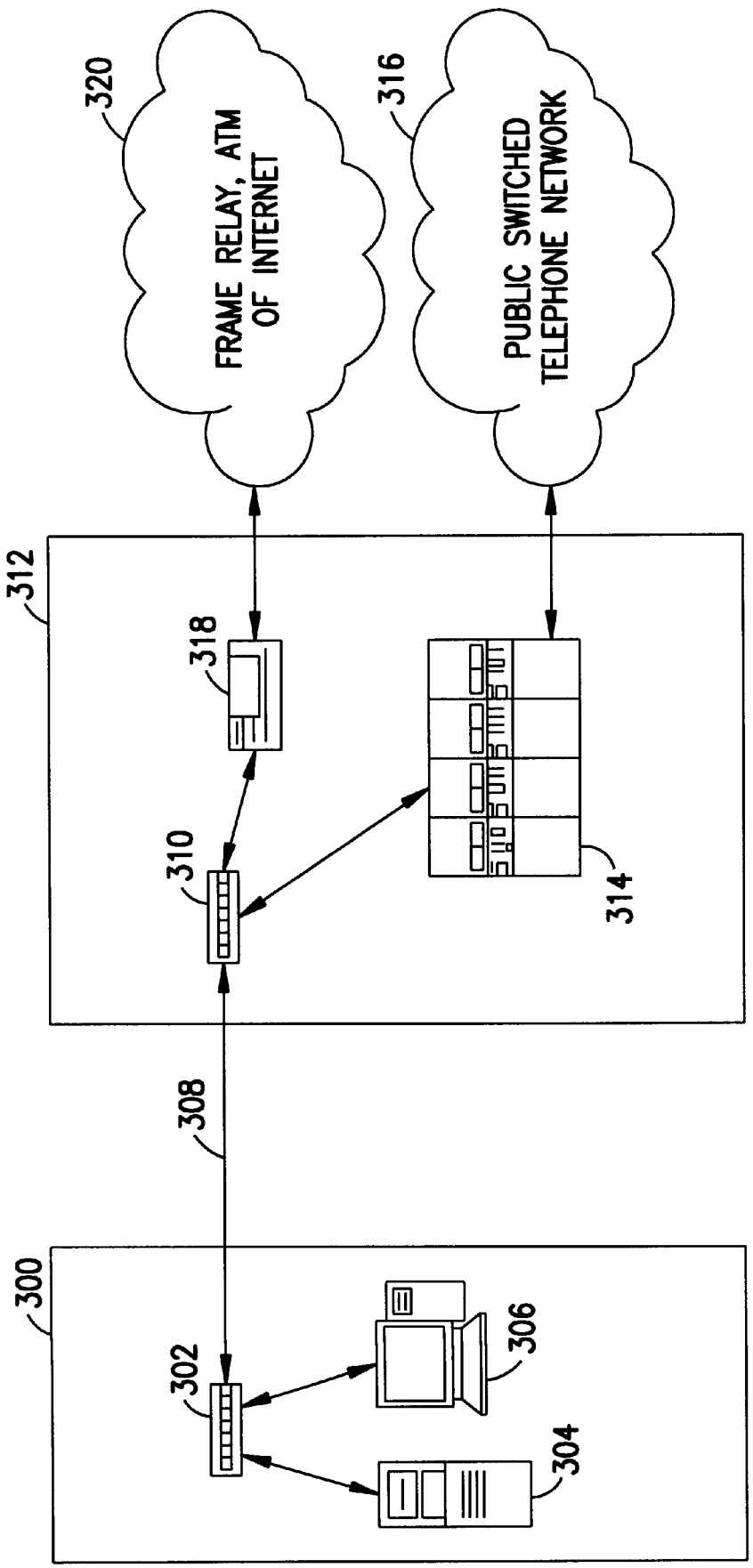
FIG. 13 is a representational diagram showing one implementation of the present invention.

FIG. 13 shows an example implementation of the present invention. On the customer's premises 300, a device 302 of the present invention is connected to a PBX system 304 and a computer network 306. The PBX system is connected to multiple phones on the customer's premises. The PBX system 304 is the switched data equipment 102 of FIG. 6, while the computer network 306 is the unswitched data equipment 106. Alternatively, the PBX system 304 could be replaced by multiple phones attached to device 302 through POTS lines.

The device 302 is connected through the local loop 308 to a remote device 310 at the telecommunications company's central office 312. The remote device 310 also embodies the present invention, but is configured to interact with the equipment at the central office 312. The remote device 310 is connected to the telecommunications switch 314, which in turn is linked into the public switched telephone network, represented by cloud 316. The switch 314 is the switched data equipment 102 for remote device 310. The remote device 310 is also connected to a unit of unswitched data equipment 318, such as a router, bridge, or network switch. The unswitched data equipment 318 in turn is connected to the wider world of unswitched data, represented by cloud 320. Cloud 320 could represent Frame Relay, ATM, or even the Internet.

In this sample configuration, the customer is able to operate voice and data communications over a single local loop line 308. The dynamic bandwidth allocation possible with the present invention devices 302, 310 allow maximum utilization of a single line, perhaps eliminating the necessity of installing a second local loop 308 connection at the customer's premises 300.

While the preferred method for dynamically allocating bandwidth over local loop line 308 is through either the robbed-bit signaling embodiment or the direct monitoring embodiment, the invention as shown in FIG. 13 could be used advantageously with any dynamic bandwidth allocation scheme. For instance, although the overhead and complexity are needlessly high, the utilization of pad codes to indicate changes in bandwidth assignments, as shown in U.S. Pat. No. 5,467,344, issued to Solomon and assigned to Ascom Timeplex Trading AG, would still be in the scope of the present invention of having a single, variable bandwidth unswitched data path on the local loop.

The invention is not to be taken as limited to all of the details thereof as modifications and variations thereof may be made without departing from the spirit or scope of the invention. For example, various elements of the device 100 shown in FIG. 6 could be combined into a single element without deviating from the scope of the invention. Also, although the channel status memory 132 and the configuration memory 130 are shown and described above as separate memory elements, it is within the scope of the present invention to implement these memories as hard-wired circuits, simple logic gates, FIFO buffers, or though a state machine. It would also be possible to make simple changes in the structure or order of the steps of the described routines without significantly altering the fundamental nature of the present invention. In addition, although the present invention was described primarily in connection with a T1 local loop, the use of other connection protocols such as E1, T3, HDSL, SDSL, or VDSL would not significantly alter the present invention.

What is claimed is:

1. A telecommunications device for transmitting and receiving switched data and unswitched data over a local loop connected to a remote unit, the local loop having a plurality of time division multiplexed channels with at least one switchable channel, the telecommunications device being in communication with local switched and unswitched communications equipment, and the remote unit being in communication with remote switched and unswitched communications equipment, the telecommunications device comprising:

a) a channel status memory indicating a transmit status and a receive status for each of the channels, the transmit status and the receive status both having a first value indicating the channel is carrying the unswitched data and a second value indicating the channel is carrying the switched data;

b) a transmitter for transmitting the switched data and the unswitched data to the remote unit across the channels according to the transmit status for each channel, the transmitter embedding in the data transmitted over the switchable channel a transmit channel status signal indicating the transmit status for the switchable channel;

c) a receiver for receiving switched data and unswitched data from the remote unit across the channels according to the receive status for each channel;

d) a status detector in communication with the receiver for detecting in the data received on the switchable channel an embedded receive channel status signal;

e) a local connection monitor adapted for monitoring the local switched communications equipment for changes in a connection status for the switchable channel;

f) a controller in communication with the channel status memory, the detector and the monitor, the controller
      i) updating the transmit status of the switchable channel when the monitor detects a change in the connection status for the switchable channel, and
      ii) updating the receive status of the switchable channel when the detector detects a change in the switchable status for the specific channel.

2. The device of claim 1,
   wherein the controller is in communication with the transmitter and the receiver;
   wherein the controller selects data for transmission from the local switched and unswitched communications equipment according to the transmit status for the channels; and
   further wherein the controller presents data received from the receiver to the local switched and unswitched communications equipment according to the receive status for the channels.

3. The device of claim 1, wherein all channels carrying unswitched data are combined into a single, logical data communications stream.

4. The device of claim 3, wherein at least one channel is dedicated to transmitting and receiving unswitched data.

5. The device of claim 4,
   further comprising configuration memory for identifying the channels dedicated to transmitting and receiving unswitched data,
   wherein the controller will not update the transmit and receive status for channels that are identified as dedicated to unswitchable data.

6. The device of claim 3,
   wherein at least one channel is dedicated to transmitting and receiving unswitched data and does not contain any channel status signal embedded in the data; and
   wherein the device further comprises configuration memory for identifying the channels dedicated to transmitting and receiving unswitched data.

7. The device of claim 3, wherein the switched data and unswitched data are transmitted and received utilizing a plurality of multiframes, with at least one channel in the multiframes containing at least one significant robbed-bit signaling bit and at least one redundant robbed-bit signaling bit;

wherein the transmitter alters at least one of the redundant robbed-bit signaling bits to directly indicate the transmit status of the channel containing the altered robbed-bit signaling bit; and wherein the detector monitors the data received for altered redundant robbed-bit signaling bits altered by the remote unit.

8. The device of claim 7, wherein the controller replaces the altered bits in a received multiframe with a replacement bit equivalent to at least one of the significant robbed-bit signaling bits in the same received multiframe.

9. The device of claim 7, wherein the transmitted altered bits are set to a first setting when the transmit status of the channel containing the altered bits is the first value; and wherein the transmitted altered bits are set to a second setting when the transmit status of the channel containing the altered bits is the second value.

10. The device of claim 9, wherein the first setting, second setting, first value, and second value are each a single bit in length.

11. The device of claim 7, wherein each multiframe contains twenty-four separate one hundred ninety-three bit frames, and at least one channel in the multiframes contains two significant robbed-bit signaling bits and two redundant robbed-bit signaling bits.

12. The device of claim 11, wherein the first redundant robbed-bit signaling bit in a particular multiframe is altered, and the second redundant robbed-bit signaling bit in the particular multiframe is unchanged.

13. The device of claim 11, wherein the first redundant robbed-bit signaling bit in a particular multiframe is altered, and the second redundant robbed-bit signaling bit in the particular multiframe is set equal to the second significant robbed-bit signaling bit.

14. The device of claim 7, wherein five consecutive frames for one channel in the multiframe do not contain robbed-bit signaling bits, and the frame immediately following the five consecutive frames contains a robbed-bit signaling bit in a least significant bit of the one channel, and wherein the unswitched data is transmitted on the one channel using all bit positions in the five consecutive frames and in all but the least significant bit position in the frame following the five consecutive frames.

15. A method for communicating switched data and unswitched data with a remote location across a plurality of time division multiplexed channels utilizing multiframes, where switched data communication status is communicated by robbed-bit signaling, the method comprising:

a) assigning to each channel a transmit status and a receive status, each status indicating whether the channel will carry switched data or unswitched data;

b) monitoring local switched data communications equipment for a local open channel event or a close channel event relating to a particular channel;

c) changing the transmit status of the particular channel to indicate switched data upon the local open channel event;

d) changing the transmit status of the particular channel to indicate unswitched data upon the local close channel event;

e) dividing the unswitched data received from a local logical unswitched data path onto the separate channels that have an unswitched data transmit status;

f) transmitting switched data and unswitched data across the channels to the remote location according the transmit status of each channel, while incorporating robbed-bit signaling bits into at least one robbed-bit signaling channel;

g) receiving switched data and unswitched data from the remote location across the channels, while monitoring for robbed-bit signaling bits on the robbed-bit signaling channels;

h) updating the receive status for the robbed-bit signaling channels based upon the robbed-bit signaling bits received on that channel; and i) combining data received over channels that have a received status indicating unswitched data into a single logical data path.

16. The method of claim 15, further comprising:

j) assigning the transmit status and the receive status to indicate unswitched data for all channels not containing robbed-bit signaling bits.

17. The method of claim 15, wherein step f) further comprises:

i) receiving from the local switched data communications equipment robbed-bit signaling bits A, B, C, and D for a particular robbed-bit signaling channel in a particular multiframe;

ii) transmitting robbed-bit signaling bits A and B without change; and iii) replacing robbed-bit signaling bit C with a bit directly indicating the transmit status for the particular robbed-bit signaling channel.

18. The method of claim 17, wherein step f) further comprises:

iv) replacing robbed-bit signaling bit D with the value of robbed-bit signaling bit B.

19. The method of claim 17, further comprising:

j) setting robbed-bit signaling bit C to equal robbed-bit signaling bit A for the data received from the remote location on the particular robbed-bit signaling channel.

20. A method for transmitting switched data and unswitched data from local switched and unswitched communications equipment to a remote location across a plurality of time division multiplexed channels utilizing multiframes and redundant robbed-bit signaling, the method comprising:

a) assigning to each channel a transmit status and a receive status, each status indicating whether the channel forms part of a single logical unswitched data path or is utilized as a separate switched data path;

b) monitoring local switched communications equipment for a local channel event relating to a particular channel;

c) changing the transmit status of the particular channel upon the channel event;

d) changing the receive status of the particular channel to coincide with the transmit status for the particular channel after a preset time delay after monitoring a local channel event;

e) transmitting switched data and unswitched data across the channels to the remote location according to the transmit status of each channel; and f) receiving switched data and unswitched data from the remote location across the channels according to the receive status for the channels.

21. The method of claim 20 further comprising the steps of:
   g) separating outgoing unswitched data from the single logical data path into the channels that have an unswitched data transmit status; and
   h) combining data received over channels that have an unswitched data receive status into the single logical data path.

22. The method of claim 20, further comprising the steps of:
   g) monitoring data received on the particular channel for the occurrence of a remote channel event;
   h) updating the receive status for the particular channel on the occurrence of the remote channel event; and
   i) updating the transmit status for the particular channel to coincide with the receive status for the particular channel after a preset time delay after monitoring a remote channel event.

23. The method of claim 20, wherein the switched data is transmitted incorporating robbed-bit signaling bits.

24. The method of claim 23, further comprising
   g) monitoring received data for the occurrence of a remote channel event as indicated by the robbed-bit signaling bits; and
   h) updating the receive status for a channel on the occurrence of the remote channel event.

25. A system for communicating switched data and unswitched data over a local loop, the system comprising:
   a) a local switched data equipment device for providing and receiving switched data over at least one switched data path;
   b) a local unswitched data equipment device for providing and receiving unswitched data over one unswitched data path;
   c) a remote switched data equipment device in communication with the local switched data equipment device over the at least one switched data paths, wherein the switched data equipment devices communicate data path status information to each other by embedding robbed-bit signaling bits into the data path;
   d) a remote unswitched data equipment device in communication with the local unswitched data equipment over the unswitched data path;
   e) a high-bandwidth local loop carrier divided into time division multiplexed channels;
   f) a local communications device in communication with the local switched data equipment device, the local unswitched data equipment device, and the carrier; and
   g) a remote communications device in communication with the remote switched data equipment device, the remote unswitched data equipment device, and the carrier;
   h) the local and remote communications devices each having
      i) a determination means for determining, by examining the robbed-bit signaling bits, whether the switched data paths are actually carrying switched data;
      ii) a switched data assignment means for assigning one channels to each switched data paths actually carrying switched data; and
      iii) an unswitched data assignment means for assigning all channels not actually carrying switched data to the unswitched data path.

26. The system of claim 25, wherein the communications devices communicate channel assignment information by replacing a redundant robbed-bit signaling bit with a channel assignment status bit.

* * * * *